(12) United States Patent
Mochizuki et al.

(10) Patent No.: US 12,138,794 B2
(45) Date of Patent: Nov. 12, 2024

(54) INFORMATION PROCESSING APPARATUS AND INFORMATION PROCESSING METHOD

(71) Applicant: SONY GROUP CORPORATION, Tokyo (JP)

(72) Inventors: Daisuke Mochizuki, Tokyo (JP); Yusuke Yoshizawa, Tokyo (JP); Mika Nagae, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 467 days.

(21) Appl. No.: 17/423,147

(22) PCT Filed: Dec. 12, 2019

(86) PCT No.: PCT/JP2019/048800
§ 371 (c)(1),
(2) Date: Jul. 15, 2021

(87) PCT Pub. No.: WO2020/153038
PCT Pub. Date: Jul. 30, 2020

(65) Prior Publication Data
US 2022/0126439 A1 Apr. 28, 2022

(30) Foreign Application Priority Data

Jan. 22, 2019 (JP) .................................. 2019-008506

(51) Int. Cl.
*B25J 9/16* (2006.01)
*B25J 9/00* (2006.01)
(Continued)

(52) U.S. Cl.
CPC ............. *B25J 9/163* (2013.01); *B25J 9/0003* (2013.01); *B25J 11/001* (2013.01); *B25J 13/003* (2013.01);
(Continued)

(58) Field of Classification Search
CPC ........ B25J 9/163; B25J 9/0003; B25J 11/001; B25J 13/003; B25J 19/023; G06V 40/10; G06V 40/28

See application file for complete search history.

(56) References Cited

U.S. PATENT DOCUMENTS 10,486,312 B2 * 11/2019 Yamato .................. G06N 3/008
2019/0065930 A1    2/2019 Son et al.
(Continued)

FOREIGN PATENT DOCUMENTS

CN    109074510 A    12/2018
EP      3435292 A1     1/2019
(Continued)

OTHER PUBLICATIONS

International Search Report and Written Opinion of PCT Application No. PCT/JP2019/048800, issued on Mar. 17, 2020, 14 pages of ISRWO.

*Primary Examiner* — Kira Nguyen
(74) *Attorney, Agent, or Firm* — CHIP LAW GROUP

(57) ABSTRACT

Provided is an information processing apparatus including a communication unit that transmits sensing data collected by an autonomous mobile object to a server, in which the communication unit transmits the sensing data related to a predetermined learning target to the server, and receives a dictionary for recognition generated by recognition learning using the sensing data collected by a plurality of the autonomous mobile objects and related to the learning target. In addition, provided is an information processing apparatus including a control unit that controls presentation of a progression status related to recognition learning for generating a dictionary for recognition used for an autonomous mobile object, in which the recognition learning is executed by using sensing data collected by a plurality of the autonomous mobile objects and related to a predetermined learning target.

19 Claims, 19 Drawing Sheets

(51) Int. Cl.
*B25J 11/00* (2006.01)
*B25J 13/00* (2006.01)
*B25J 19/02* (2006.01)
*G06V 40/10* (2022.01)
*G06V 40/20* (2022.01)

(52) U.S. Cl.
CPC ............ *B25J 19/023* (2013.01); *G06V 40/10* (2022.01); *G06V 40/28* (2022.01)

(56) References Cited

U.S. PATENT DOCUMENTS

| | | | |
|---|---|---|---|
| 2019/0143528 A1* | 5/2019 | Hayashi | ............... B25J 11/0015 |
| | | | 700/245 |
| 2019/0315003 A1 | 10/2019 | Iwanami | |
| 2020/0097012 A1* | 3/2020 | Hong | .................. A47L 11/4011 |
| 2020/0142545 A1* | 5/2020 | Wald | ....................... G06N 20/00 |
| 2020/0311616 A1* | 10/2020 | Rajkumar | ............... G06N 3/008 |
| 2021/0046638 A1* | 2/2021 | Moon | .................... B25J 19/026 |

FOREIGN PATENT DOCUMENTS

| | | |
|---|---|---|
| JP | 2003-140710 A | 5/2003 |
| JP | 2012-115988 A | 6/2012 |
| JP | 2017-199319 A | 11/2017 |
| JP | 2018120302 A | 8/2018 |
| JP | 2018-152063 A | 9/2018 |
| WO | 2017/212723 A1 | 12/2017 |
| WO | 2017/217038 A1 | 12/2017 |
| WO | 2018/168521 A1 | 9/2018 |
| WO | 2018/173121 A1 | 9/2018 |

\* cited by examiner

FIG. 6
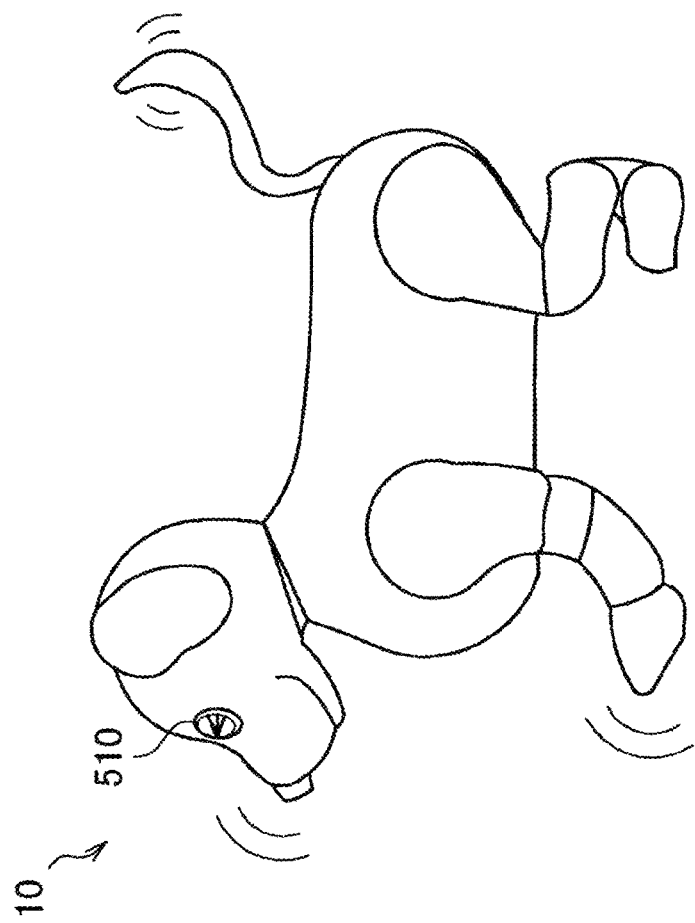
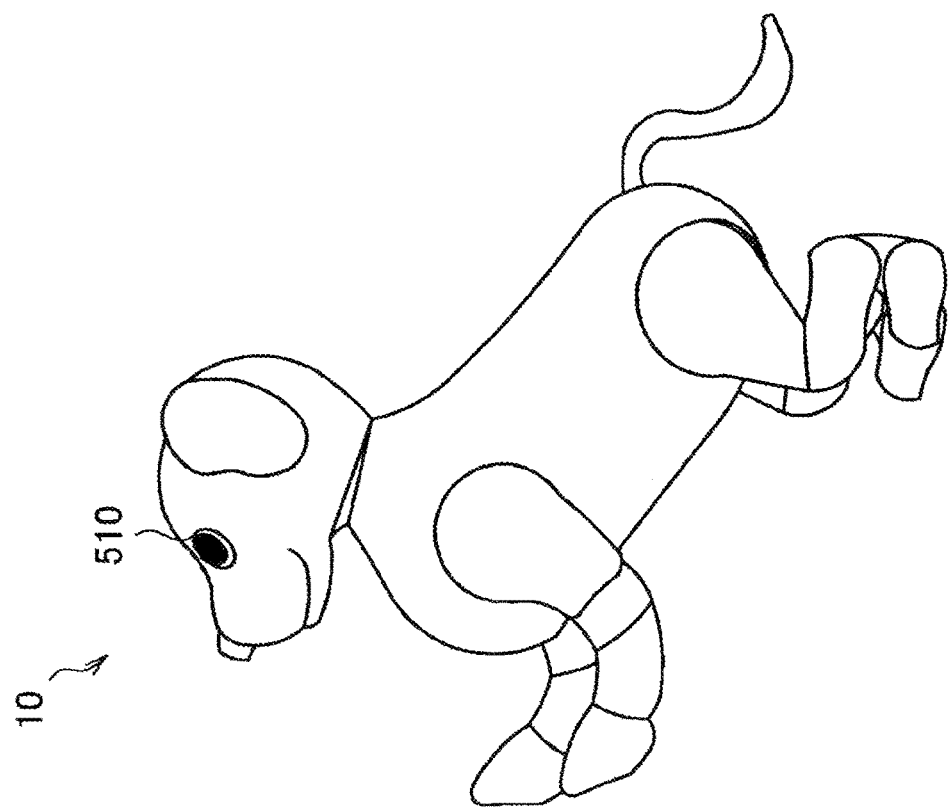

FIG. 11
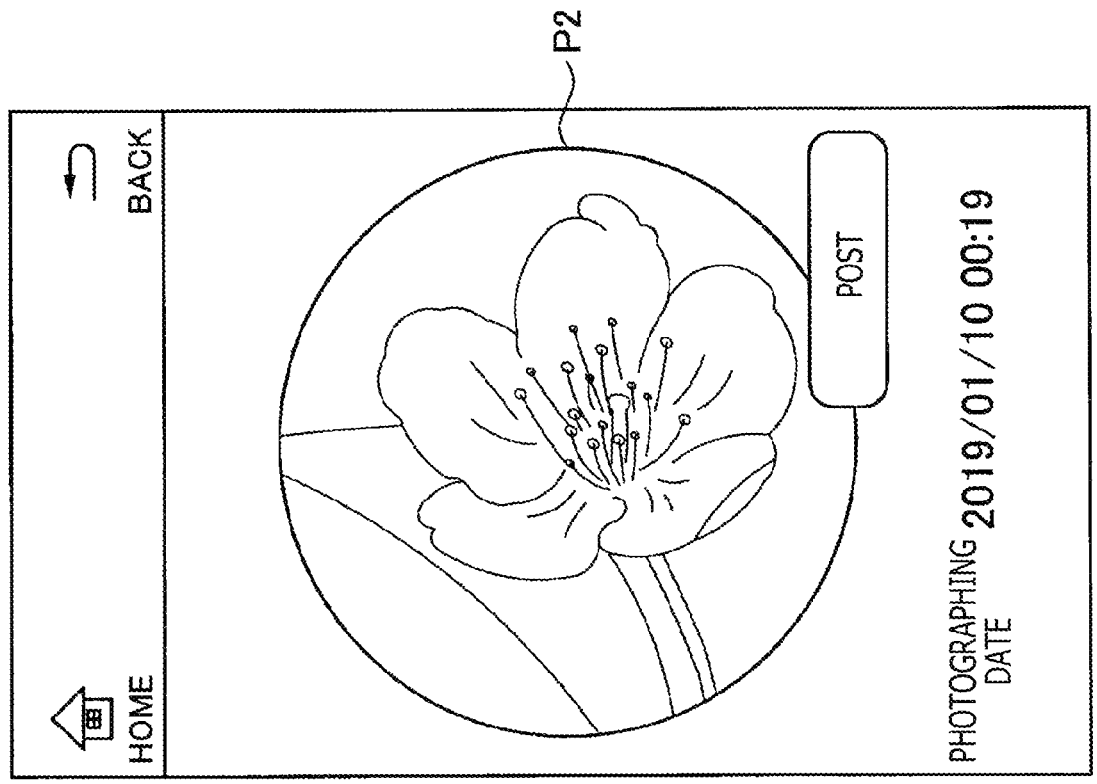
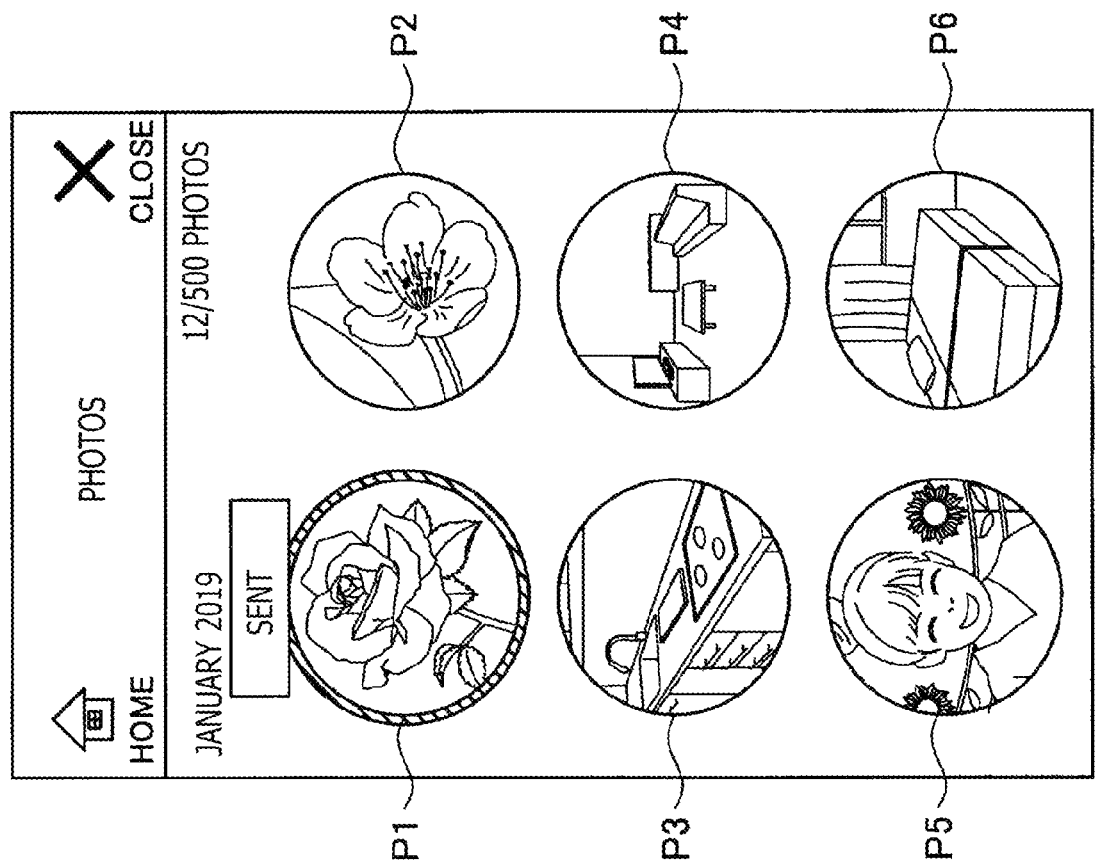

FIG.13

LET ROBOTS MEMORIZE FLOWERS

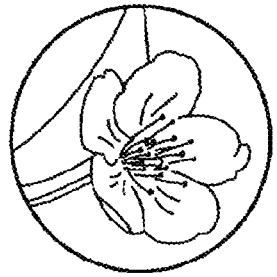

CHALLENGE PERIOD 2019/01/11〜2019/02/28

| CURRENT NUMBER OF PARTICIPATING ROBOTS | NUMBER OF PHOTOS COLLECTED |
|---|---|
| 12,345 BODIES | 56,789 PHOTOS |

COOPERATIVE ROBOTS WITH
50 PHOTOS OR MORE
(JAPANESE SYLLABARY ORDER)

- AI-CHAN          OWNER: A
- UMI-CHAN         OWNER: B
- OLIVER-CHAN      OWNER: C
- ZAKURO-CHAN      OWNER: D

COOPERATIVE ROBOTS WITH
30 PHOTOS OR MORE
(JAPANESE SYLLABARY ORDER)

- ICHIGO-CHAN      OWNER: E
- SAKURA-CHAN      OWNER: F
- DARIA-CHAN       OWNER: G
- BOB-CHAN         OWNER: H

FIG.16
FLOWER RECOGNIZER ver. 1.02    (2019/1/11)
RECOGNITION EXAMPLES (54,343 PHOTOS)
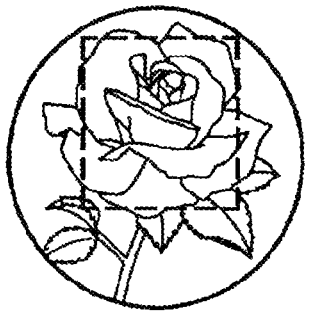 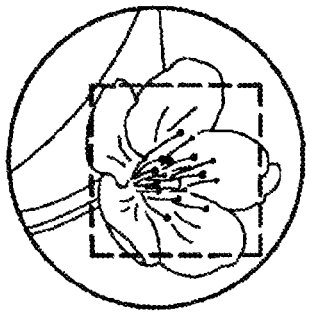
NO DETECTION EXAMPLES (1,032 PHOTOS)
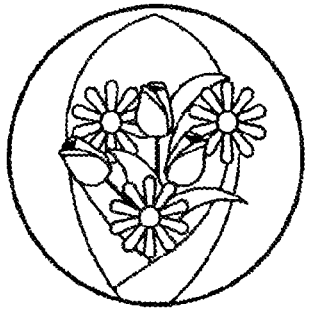 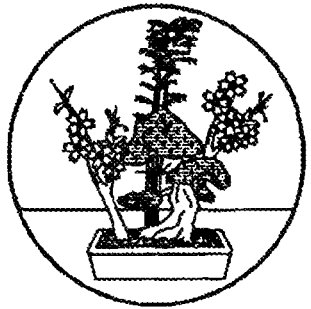
FALSE RECOGNITION EXAMPLES (286 PHOTOS)
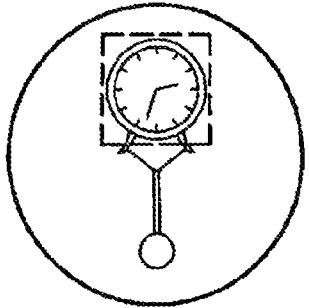 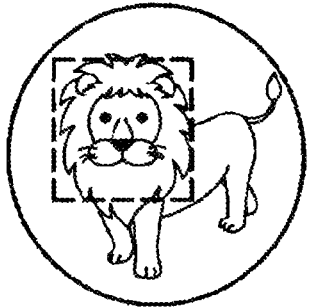

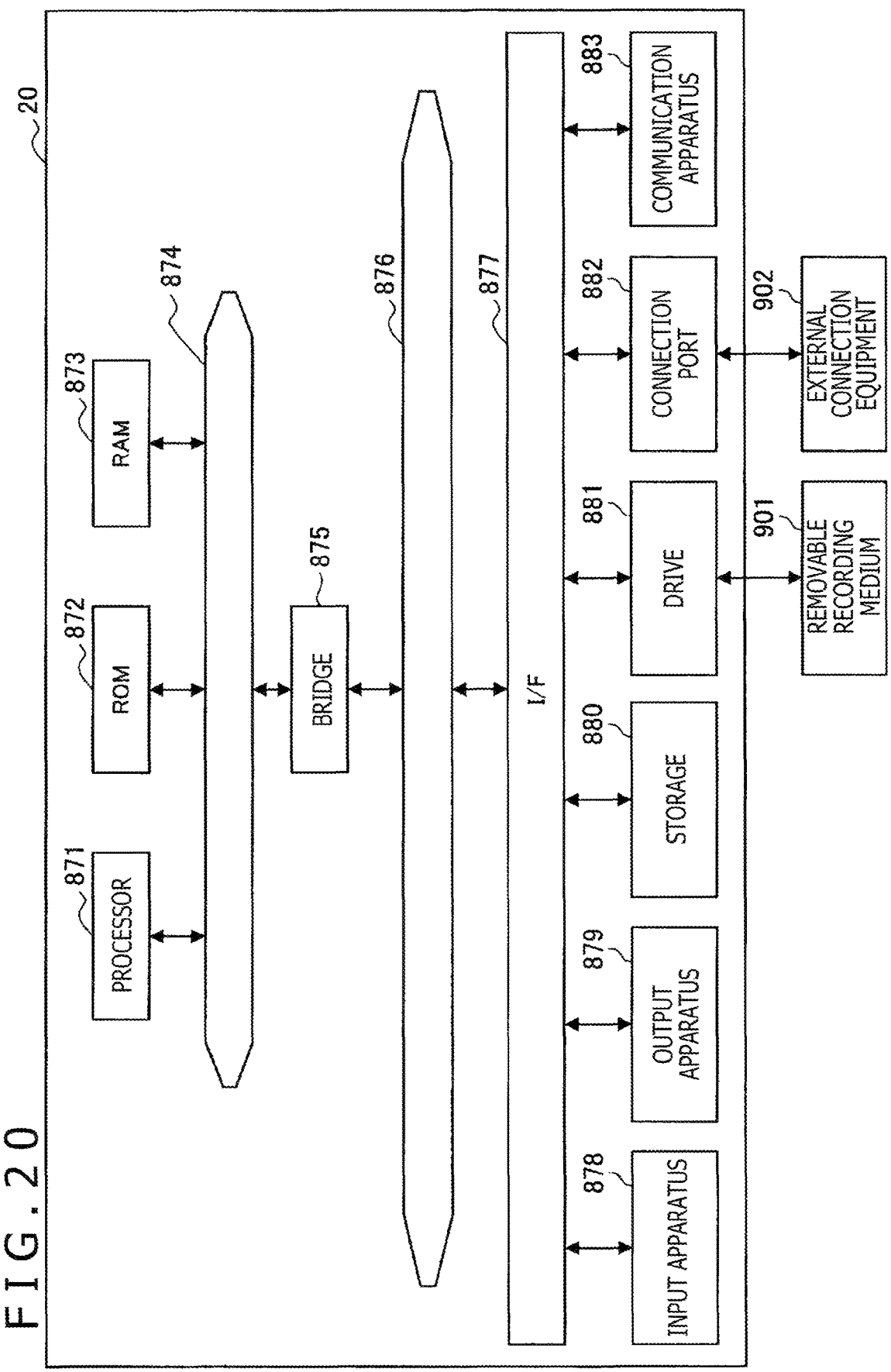

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/048800 filed on Dec. 12, 2019, which claims priority benefit of Japanese Patent Application No. JP 2019-008506 filed in the Japan Patent Office on Jan. 22, 2019. Each of the above-referenced applications is hereby incorporated herein by reference in its entirety.

TECHNICAL FIELD

The present disclosure relates to an information processing apparatus, an information processing method, and a program.

BACKGROUND ART

In recent years, various apparatuses having a learning function have been developed. The above apparatuses include an autonomous mobile object such as a robot that performs an autonomous motion on the basis of estimated situations. In addition, a number of techniques to diversify more actions that the above-described autonomous mobile object can take have been proposed. For example, PTL 1 discloses a technique for giving variations to the nature of an autonomous mobile object by creating a new action pattern in accordance with the nature of other information home electric appliances.

CITATION LIST

Patent Literature

[PTL 1]
Japanese Patent Laid-open No. 2003-140710

SUMMARY

Technical Problem

Incidentally, in general, the action of the autonomous mobile object can be more diversified as targets that the autonomous mobile object can recognize increase. However, in order to increase the targets described above, it is required to prepare a large amount of learning data related to the targets.

Solution to Problem

According to the present disclosure, provided is an information processing apparatus including a communication unit that transmits sensing data collected by an autonomous mobile object to a server, in which the communication unit transmits the sensing data related to a predetermined learning target to the server and receives a dictionary for recognition generated by recognition learning using the sensing data collected by a plurality of the autonomous mobile objects and related to the learning target.

In addition, according to the present disclosure, provided is an information processing apparatus including a control unit that controls presentation of a progression status related to recognition learning for generating a dictionary for recognition used for an autonomous mobile object, in which the recognition learning is executed by using sensing data collected by a plurality of the autonomous mobile objects and related to a predetermined learning target.

In addition, according to the present disclosure, provided is an information processing method including transmitting sensing data collected by an autonomous mobile object and related to a predetermined learning target to a server, and receiving a dictionary for recognition generated by recognition learning using the sensing data collected by a plurality of the autonomous mobile objects and related to the learning target.

In addition, according to the present disclosure, provided is an information processing method including controlling, by a processor, presentation of a progression status related to recognition learning for generating a dictionary for recognition used for an autonomous mobile object, in which the recognition learning is executed by using sensing data collected by a plurality of the autonomous mobile objects and related to a predetermined learning target.

BRIEF DESCRIPTION OF DRAWINGS

FIG. 6 is a diagram illustrating a motion example of the autonomous mobile object according to the embodiment.

FIG. 11 is a diagram for describing posting of sensing data according to the embodiment.

FIG. 13 is an example of a progression status presentation screen according to the embodiment.

FIG. 16 is a diagram for describing a case display of a recognition result according to the embodiment.

FIG. 20 is a diagram illustrating an example of a hardware configuration of the information processing server according to the embodiment of the present disclosure.

DESCRIPTION OF EMBODIMENT

Figure 1:
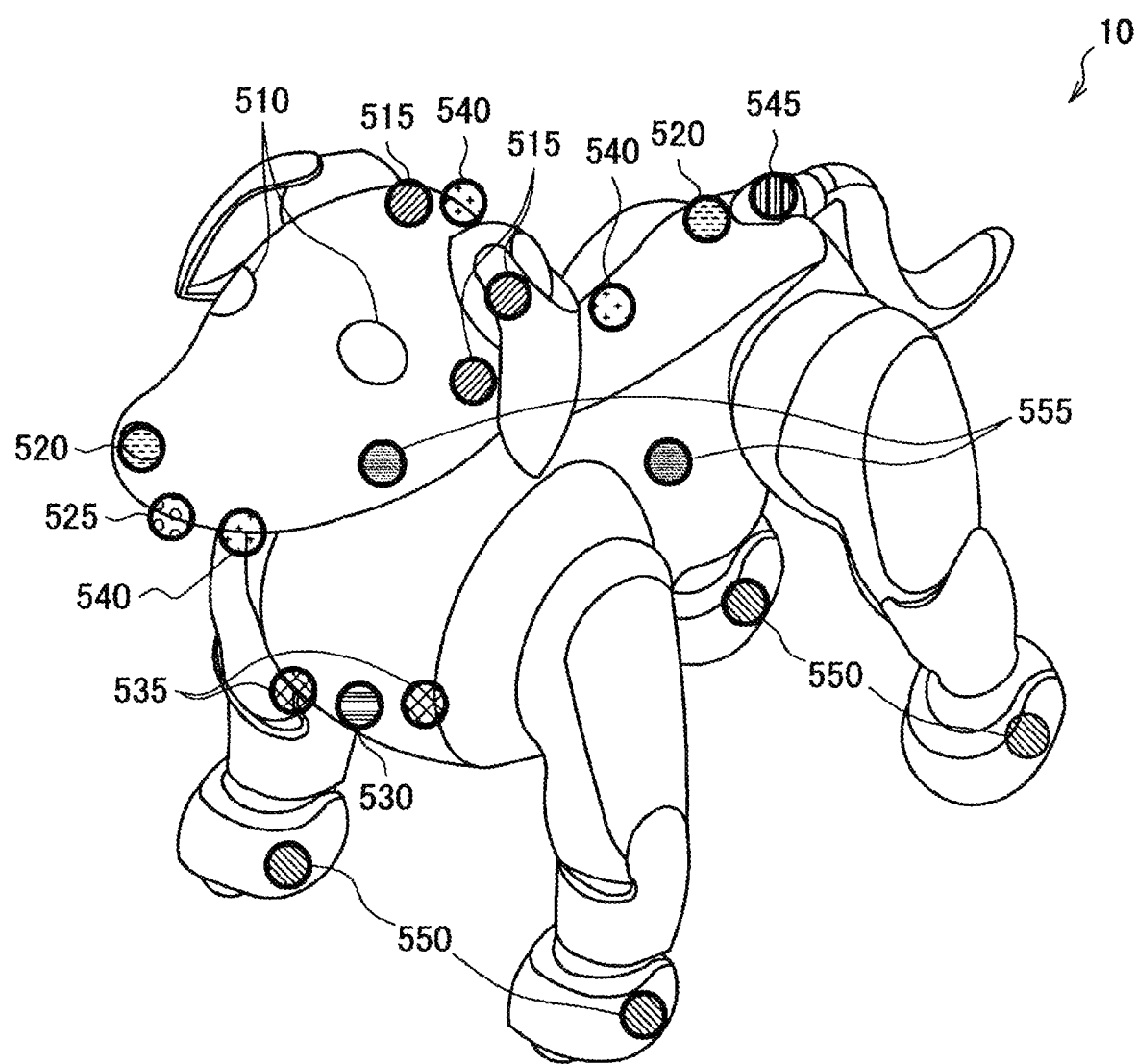
FIG. 1 is a diagram illustrating an example of a hardware configuration of an autonomous mobile object according to an embodiment of the present disclosure.

Hereinafter, a preferred embodiment of the present disclosure will be described in detail with reference to the accompanying drawings. It should be noted that constitutional elements having substantially the same functional configurations will be followed by the same reference numerals in the specification and drawings, and duplicated description thereof will be omitted.

It should be noted that the explanation will be made in the following order.

1. Embodiment
    1.1. Outline of autonomous mobile object 10
    1.2. Example of hardware configuration of autonomous mobile object 10
    1.3. Outline of embodiment
    1.4. Example of system configuration
    1.5. Example of functional configuration of autonomous mobile object 10
    1.6. Example of functional configuration of information processing server 20
    1.7. Details of function
    1.8. Processing flow
2. Example of hardware configuration of information processing server 20
3. Summary 1. Embodiment 1.1. Outline of Autonomous Mobile Object 10

First, an outline of an autonomous mobile object 10 according to an embodiment of the present disclosure will be described. The autonomous mobile object 10 according to the embodiment of the present disclosure is an information processing apparatus that executes various kinds of recognition processes based on collected sensing data and autonomously selects and executes various motions according to situations. Unlike a robot that simply performs a motion in accordance with an instruction command of a user, one of the features of the autonomous mobile object 10 is to autonomously execute a motion estimated to be optimum for each situation.

The autonomous mobile object 10 according to the embodiment of the present disclosure can execute, for example, user recognition and object recognition based on a photographed image, and the like, and can perform various autonomous actions according to the recognized user, object, and the like. In addition, the autonomous mobile object 10 according to the embodiment can execute, for example, voice recognition based on the utterance of the user, and can perform an action based on an instruction of the user and the like.

At this time, in order to perform recognition related to the user, the object, or other targets, it is necessary to perform recognition learning using sensing data related to a target in advance. In addition, in order to generate a recognizer having sufficient recognition performance, it is important to secure a large amount of diverse sensing data.

However, it is practically difficult for a developer to prepare the sensing data as described above in advance and to cause the autonomous mobile object 10 to learn. Therefore, a framework for efficiently collecting the sensing data used for the recognition learning has been required.

The technical idea according to the present disclosure is conceived by paying attention to the above points, and enables to efficiently collect the sensing data used for the recognition learning and to increase recognizable targets. Learning related to pattern recognition can be more efficiently realized. For this purpose, the autonomous mobile object 10 according to the embodiment of the present disclosure includes a communication unit 180 that transmits collected sensing data to an information processing server 20. In addition, one of the features of the communication unit 180 according to the embodiment of the present disclosure is to transmit the sensing data related to a predetermined learning target to the information processing server 20 and to receive a dictionary for recognition generated by the recognition learning using the sensing data collected by a plurality of autonomous mobile objects 10 and related to the learning target.

That is, the autonomous mobile object 10 (described as an information processing apparatus in some cases) according to the embodiment can increase recognizable targets by downloading a dictionary for recognition storing parameters and the like of a recognizer generated by the recognition learning using the sensing data collected by a plurality of autonomous mobile objects 10 including the autonomous mobile object 10 itself.

In addition, one of the features of the information processing server 20 (described as an information processing apparatus in some cases) according to the embodiment of the present disclosure is to include an application control unit 230 (simply described as a control unit in some cases) for controlling presentation of a progression status related to the recognition learning for generating the dictionary for recognition used for the autonomous mobile object 10.

According to the above configuration, the user who owns the autonomous mobile object 10 can intuitively recognize that the performance of the autonomous mobile object 10 is improved by uploaded sensing data, and it is possible to efficiently secure a large amount of sensing data by guiding the user to perform more positively.

Hereinafter, a configuration of the autonomous mobile object 10 that realizes the above features will be described in detail. It should be noted that the autonomous mobile object 10 according to the embodiment of the present disclosure may be an autonomous mobile robot that autonomously moves in a space and executes various motions. The autonomous mobile object 10 may be an autonomous mobile robot having, for example, a shape imitating an animal such as a human or a dog and a motion capability thereof. In addition, the autonomous mobile object 10 may also be, for example, a vehicle or other apparatuses capable of communicating with the user. The shape, capability, and level or desire or the like of the autonomous mobile object 10 according to the embodiment of the present disclosure can be appropriately designed according to purposes and roles.

1.2. Example of Hardware Configuration of Autonomous Mobile Object 10

Next, an example of a hardware configuration of the autonomous mobile object 10 according to the embodiment of the present disclosure will be described. It should be noted that a case where the autonomous mobile object 10 is a dog-shaped quadruped walking robot will be described below as an example.

FIG. 1 is a diagram illustrating an example of a hardware configuration of the autonomous mobile object 10 according to the embodiment of the present disclosure. As illustrated in FIG. 1, the autonomous mobile object 10 is a dog-shaped quadruped walking robot having a head portion, a torso portion, four leg portions, and a tail portion. In addition, the autonomous mobile object 10 includes two displays 510 on the head portion.

In addition, the autonomous mobile object 10 includes various sensors. The autonomous mobile object 10 includes, for example, a microphone 515, a camera 520, a ToF (Time of Flight) sensor 525, a human detection sensor 530, a distance measurement sensor 535, a touch sensor 540, an illuminance sensor 545, a foot sole button 550, and an inertial sensor 555.

(Microphone 515)

The microphone 515 has a function of collecting ambient sound. The above sound includes, for example, the utterance of the user and ambient environmental sound. The autonomous mobile object 10 may include, for example, four microphones on the head portion. Sound generated in the surroundings can be collected with high sensitivity and localization of a sound source can be realized by including a plurality of microphones 515.

(Camera 520)

The camera 520 has a function of photographing the user and the surrounding environment. The autonomous mobile object 10 may include, for example, two wide-angle cameras at the tip of a nose and a waist portion. In this case, the wide-angle camera arranged at the tip of the nose photographs an image corresponding to the front visual field (namely, the visual field of a dog) of the autonomous mobile object, and the wide-angle camera at the waist portion photographs an image of a surrounding region with the upper side as a center. The autonomous mobile object 10 extracts, for example, a feature point of a ceiling on the basis of the image photographed by the wide-angle camera arranged at the waist portion, and can realize SLAM (Simultaneous Localization and Mapping).

(ToF Sensor 525)

The ToF sensor 525 has a function of detecting a distance to an object existing in front of the head portion. The ToF sensor 525 is provided at the tip of the nose of the head portion. According to the ToF sensor 525, distances to various objects can be detected with high accuracy, and a motion according to a relative position to a target object including the user, an obstacle, or the like can be realized.

(Human Detection Sensor 530)

The human detection sensor 530 has a function of detecting a location of the user, a pet reared by the user, or the like. The human detection sensor 530 is arranged at, for example, a breast portion. According to the human detection sensor 530, by detecting a moving object existing in front thereof, various motions for the moving object, for example, motions according to emotions such as interest, fear, and surprise can be realized.

(Distance Measurement Sensor 535)

The distance measurement sensor 535 has a function of acquiring the situation of the floor surface in front of the autonomous mobile object 10. The distance measurement sensor 535 is arranged, for example, at the breast portion. According to the distance measurement sensor 535, a distance to an object existing on the floor surface in front of the autonomous mobile object 10 can be detected with high accuracy, and a motion according to a relative position to the object can be realized.

(Touch Sensor 540)

The touch sensor 540 has a function of detecting contact by the user. The touch sensor 540 is arranged at a site of the autonomous mobile object 10, for example, a top of the head, a site under the chin, the back, or the like, that the user touches with high possibility. The touch sensor 540 may be, for example, a capacitive or pressure-sensitive touch sensor. According to the touch sensor 540, contact actions such as touching, stroking, tapping, and pushing by the user can be detected, and motions according to the contact actions can be performed.

(Illuminance Sensor 545)

The illuminance sensor 545 detects the illuminance of a space where the autonomous mobile object 10 is located. The illuminance sensor 545 may be arranged, for example, at a base of the tail portion on the back of the head portion. According to the illuminance sensor 545, the ambient brightness can be detected, and a motion according to the brightness can be executed.

(Foot Sole Button 550)

The foot sole button 550 has a function of detecting whether or not the bottom surfaces of the leg portions of the autonomous mobile object 10 are in contact with the floor. For this purpose, the foot sole button 550 is arranged at a site corresponding to each of the pads of the four leg portions. According to the foot sole button 550, contact or non-contact between the autonomous mobile object 10 and the floor surface can be detected, and for example, it is possible to grasp that the autonomous mobile object 10 is lifted by the user.

(Inertial Sensor 555)

The inertial sensor 555 is a six-axis sensor that detects physical quantities such as the velocities, accelerations, and rotations of the head portion and the torso portion. That is, the inertial sensor 555 detects the accelerations and angular velocities on the X-axis, Y-axis, and Z-axis. The inertial sensor 555 is arranged at each of the head portion and the torso portion. According to the inertial sensor 555, movements of the head portion and the torso portion of the autonomous mobile object 10 can be detected with high accuracy, and motion control according to situations can be realized.

The examples of the sensors included in the autonomous mobile object 10 according to the embodiment of the present disclosure have been described above. It should be noted that the above configurations described using FIG. 1 are only examples, and the configurations of the sensors that the autonomous mobile object 10 can include are not limited to the examples. In addition to the above configurations, the autonomous mobile object 10 may further include various kinds of communication apparatuses including, for example, a temperature sensor, a geomagnetic sensor, and a GNSS (Global Navigation Satellite System) signal receiver. The configurations of the sensors included in the autonomous mobile object 10 can be flexibly modified according to specifications and operations.

Figure 2:
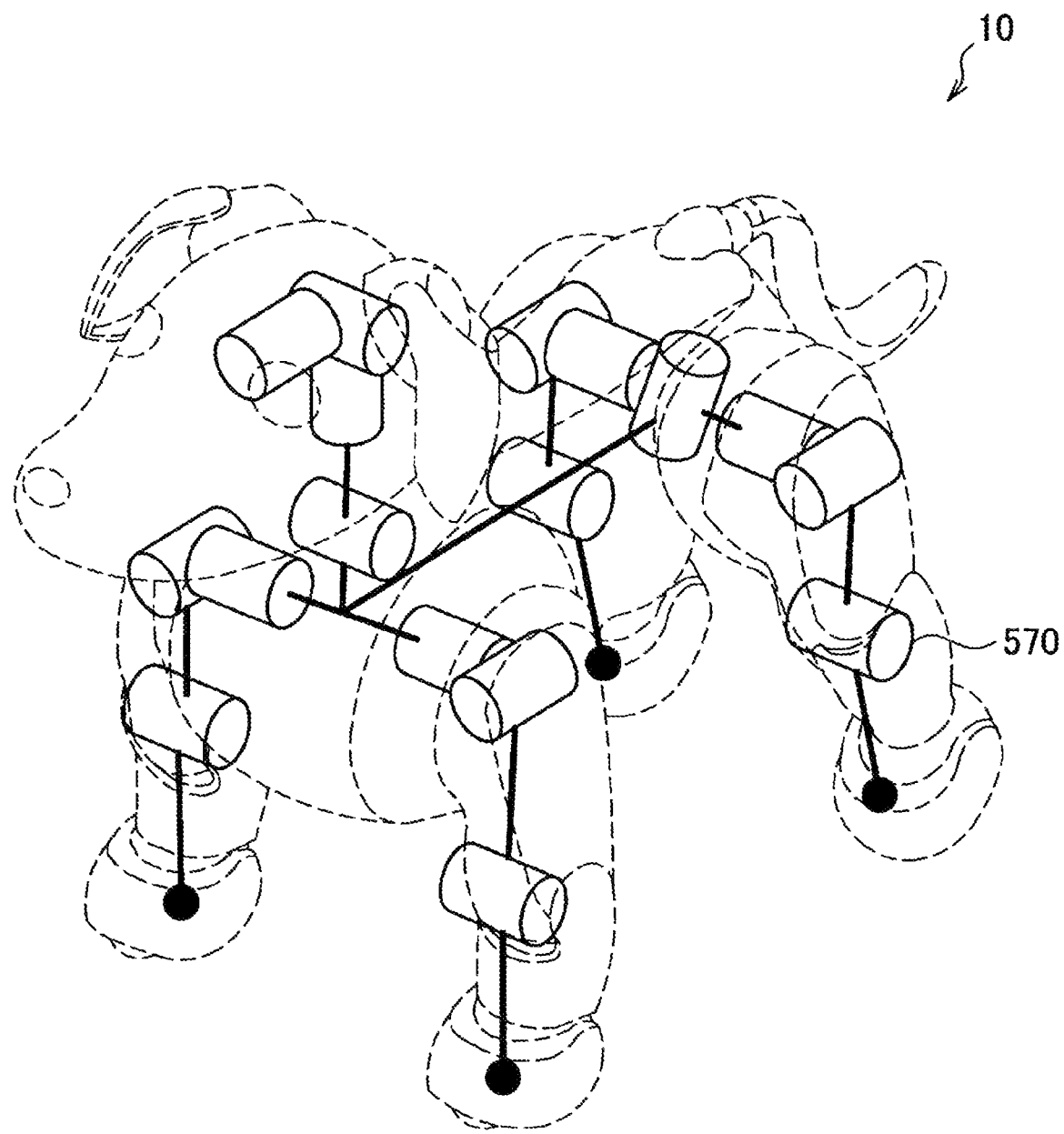
FIG. 2 is a configuration example of an actuator included in the autonomous mobile object according to the embodiment.

Next, a configuration example of a joint portion of the autonomous mobile object 10 according to the embodiment of the present disclosure will be described. FIG. 2 is a configuration example of an actuator 570 included in the autonomous mobile object 10 according to the embodiment of the present disclosure. The autonomous mobile object 10 according to the embodiment of the present disclosure has, in addition to the rotational parts illustrated in FIG. 2, a total of 22 rotational degrees of freedom, two for each of ear portions and the tail portion and one for a mouth.

For example, the autonomous mobile object 10 has three degrees of freedom in the head portion, and can accordingly perform motions of nodding and tilting of the head simultaneously. In addition, the autonomous mobile object 10 can realize a natural and flexible motion closer to a real dog by reproducing a swing motion of the waist by the actuator 570 included in the waist portion.

It should be noted that the autonomous mobile object 10 according to the embodiment of the present disclosure may realize the above 22 rotational degrees of freedom by combining, for example, a one-axis actuator and a two-axis actuator. For example, the one-axis actuators may be employed at elbow and knee portions in the leg portions, and the two-axis actuators may be employed at shoulders and the bases of thighs.

Figure 3:
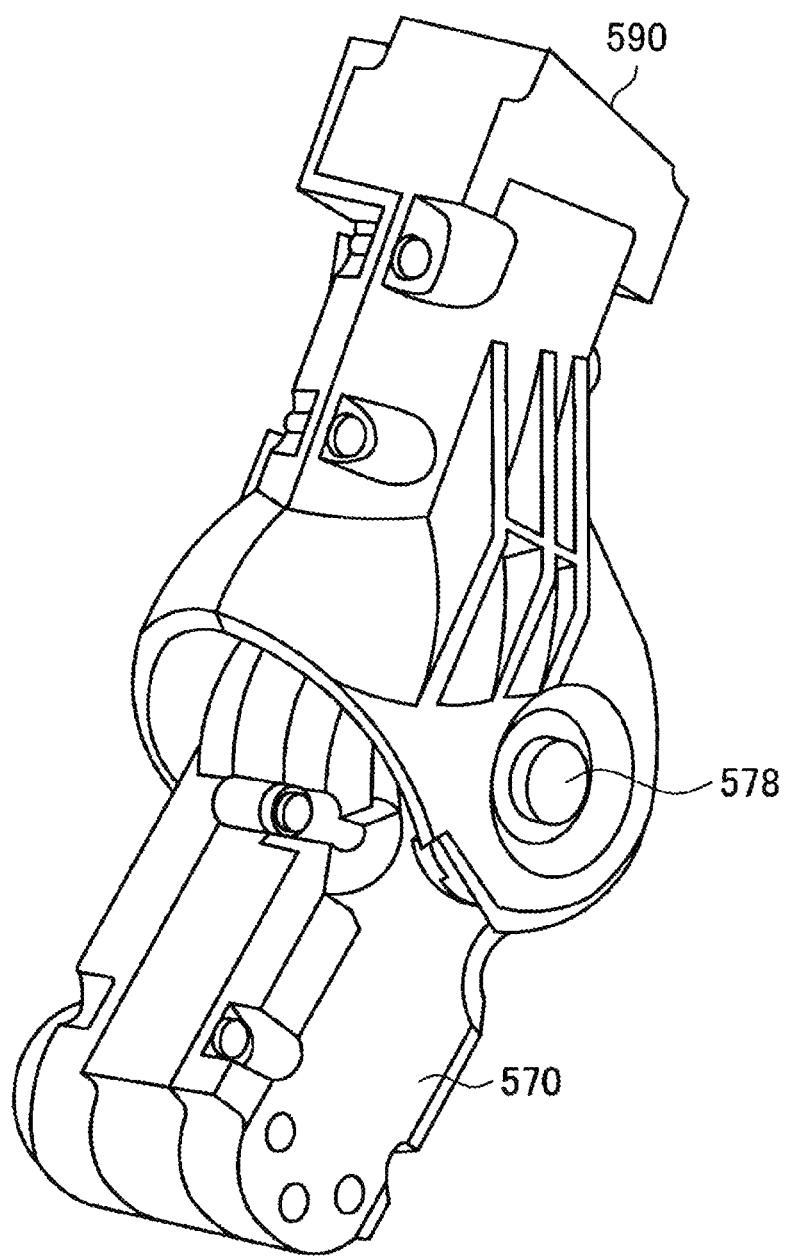
FIG. 3 is a diagram for describing a motion of the actuator included in the autonomous mobile object according to the embodiment.
Figure 4:
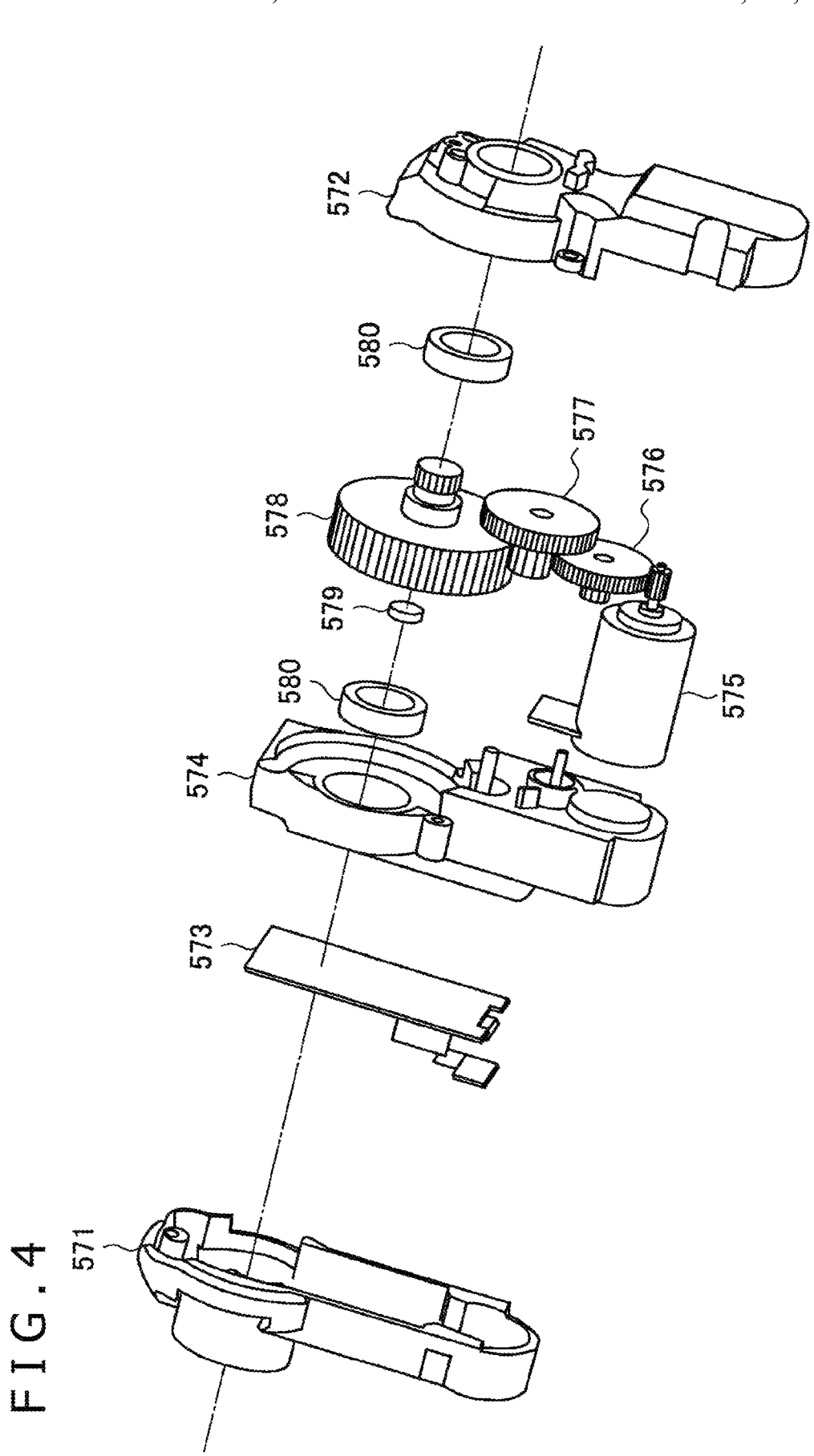
FIG. 4 is a diagram for describing a motion of the actuator included in the autonomous mobile object according to the embodiment.

FIG. 3 and FIG. 4 are diagrams each describing a motion of the actuator 570 included in the autonomous mobile object 10 according to the embodiment of the present disclosure. Referring to FIG. 3, the actuator 570 can drive a movable arm 590 at an optional rotational position and rotational speed by causing a motor 575 to rotate an output gear.

Referring to FIG. 4, the actuator 570 according to the embodiment of the present disclosure includes a rear cover 571, a gear box cover 572, a control substrate 573, a gear box base 574, the motor 575, a first gear 576, a second gear 577, an output gear 578, a detecting magnet 579, and two bearings 580.

The actuator 570 according to the embodiment of the present disclosure may be, for example, a magnetic svGMR (spin-valve Giant Magnetoresistive). The control substrate 573 rotates the motor 575 on the basis of control by a main processor, so that power is transmitted to the output gear 578 via the first gear 576 and the second gear 577 and the movable arm 590 can be driven.

In addition, a position sensor included in the control substrate 573 detects the rotational angle of the detecting magnet 579 rotating in synchronization with the output gear 578, so that the rotational angle of the movable arm 590, that is, the rotational position can be detected with high accuracy.

It should be noted that the magnetic svGMR is excellent in durability because of a non-contact type and has an advantage of being less affected by signal fluctuations due to distance fluctuations of the detecting magnet 579 and the position sensor by using the same in the GMR saturation region.

The configuration example of the actuator 570 included in the autonomous mobile object 10 according to the embodiment of the present disclosure has been described above. According to the above configuration, bending and stretching motions of the joint portions included in the autonomous mobile object 10 can be controlled with high accuracy, and the rotational positions of the joint portions can be accurately detected.

Figure 5:
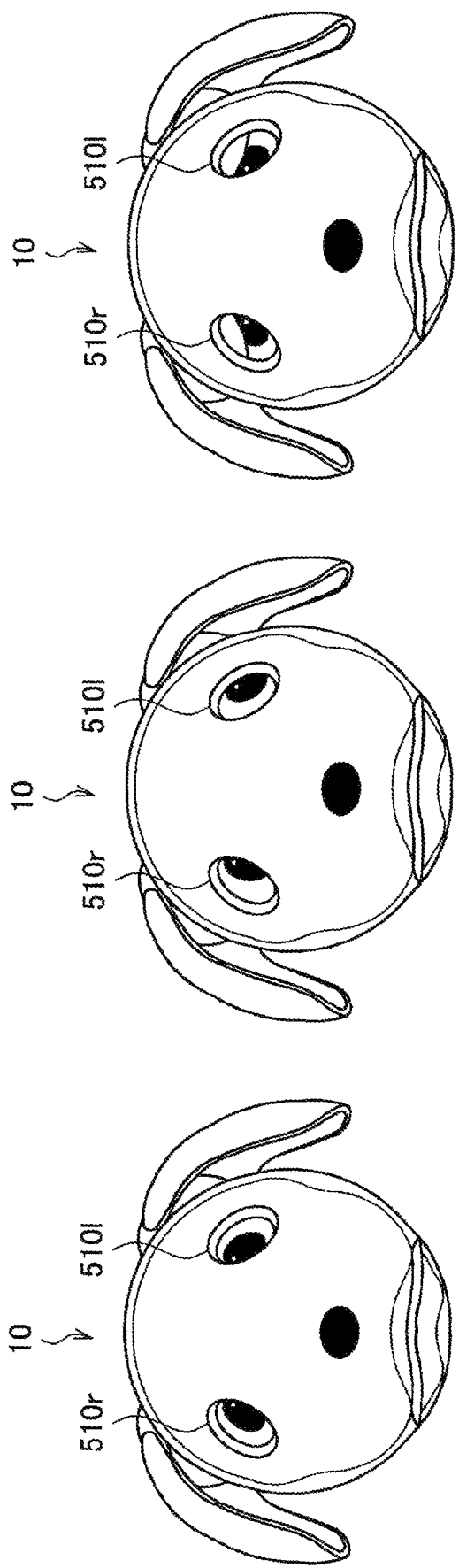
FIG. 5 is a diagram for describing a function of a display included in the autonomous mobile object according to the embodiment.

Next, a function of the display 510 included in the autonomous mobile object 10 according to the embodiment of the present disclosure will be described with reference to FIG. 5. FIG. 5 is a diagram for describing a function of the display 510 included in the autonomous mobile object 10 according to the embodiment of the present disclosure.

(Display 510)

The display 510 has a function of visually expressing movements of the eyes and emotions of the autonomous mobile object 10. As illustrated in FIG. 5, the displays 510 can express motions of the eyeballs, pupils, and eyelids according to emotions and motions. The displays 510 do not intentionally display characters, symbols, images unrelated to eyeball movement, and the like, so that a natural motion close to an actual animal such as a dog is produced.

In addition, as illustrated in FIG. 5, each autonomous mobile object 10 includes two displays 510r and 510l corresponding to the right eye and the left eye, respectively. The displays 510r and 510l are realized by, for example, two independent OLEDs (Organic Light Emitting Diodes). According to the OLEDs, the curved surfaces of the eyeballs can be reproduced, and a more natural exterior can be realized as compared to a case where a pair of eyeballs is expressed by one flat display and a case where two eyeballs are expressed by two independent flat displays.

As described above, according to the displays 510r and 510l, the visual lines and emotions of the autonomous mobile objects 10 as illustrated in FIG. 5 can be flexibly expressed with high accuracy. In addition, the user can intuitively grasp the state of the autonomous mobile object 10 from the motions of the eyeballs displayed on the displays 510.

The example of the hardware configuration of the autonomous mobile object 10 according to the embodiment of the present disclosure has been described above. According to the above configuration, as illustrated in FIG. 6, motions and emotional expressions closer to an actual living organism can be realized by flexibly controlling the motions of the joint portions and eyeballs of the autonomous mobile object 10 with high accuracy. It should be noted that although FIG. 6 is a diagram illustrating a motion example of the autonomous mobile object 10 according to the embodiment of the present disclosure, FIG. 6 illustrates the external structure of the autonomous mobile object 10 in a simplified manner in order to provide an explanation while paying attention to the motions of the joint portions and eyeballs of the autonomous mobile object 10. As similar to the above, although the external structure of the autonomous mobile object 10 is occasionally illustrated in a simplified manner in the following description, the hardware configuration and exterior of the autonomous mobile object 10 according to the embodiment of the present disclosure are not limited to the examples represented by the drawings and can be appropriately designed.

1.3. Outline of Embodiment

Figure 7:
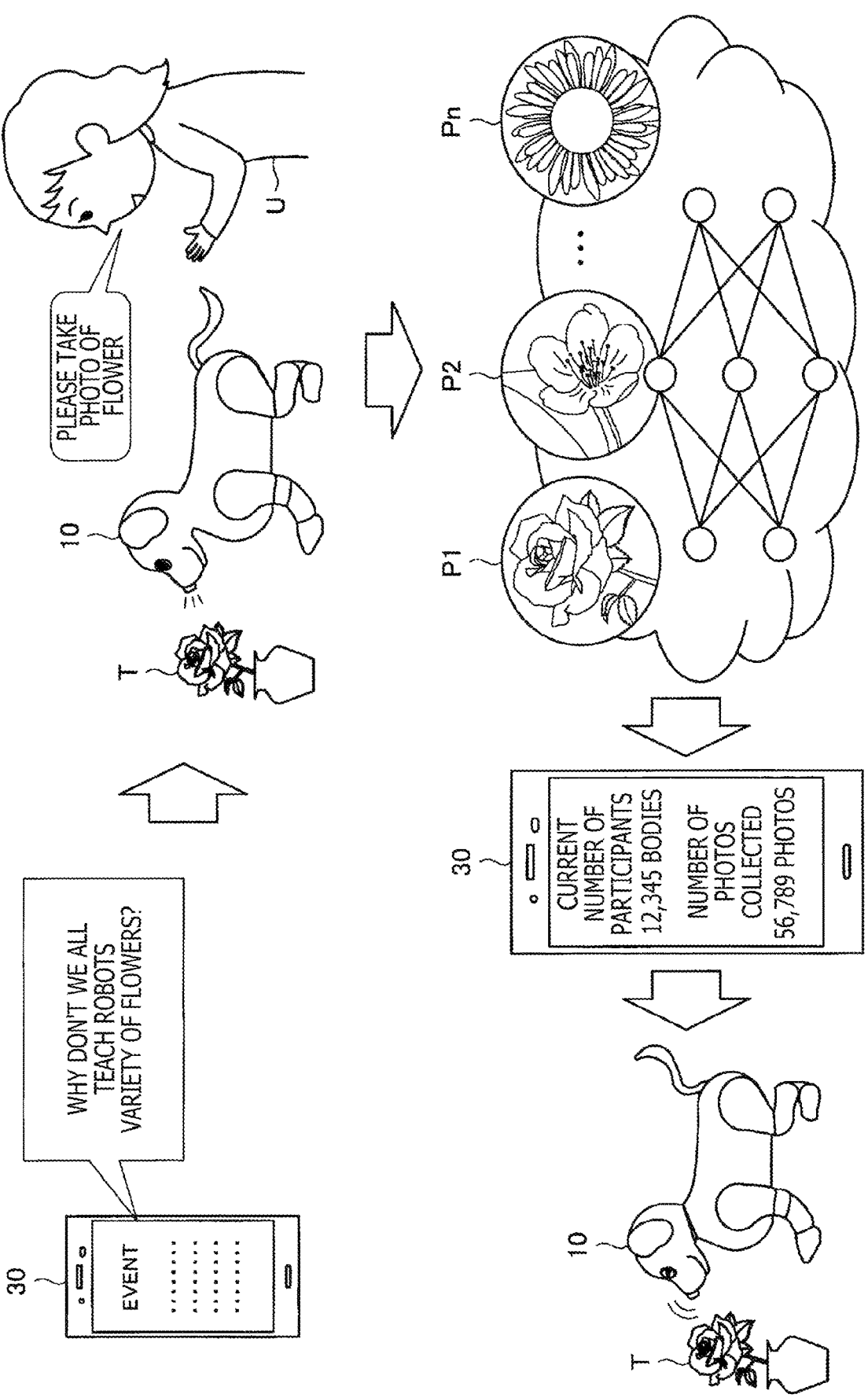
FIG. 7 is a diagram for describing an outline of the embodiment.

Next, an outline of the embodiment of the present disclosure will be described. As described above, the technical idea according to the embodiment enables to efficiently collect a large amount of sensing data related to the learning target in order to increase the targets that can be recognized by the autonomous mobile object 10. FIG. 7 is a diagram for describing an outline of the embodiment. It should be noted that FIG. 7 illustrates an example of a case where sensing data, that is, image data used for object recognition learning with a "flower" as the learning target is collected.

As illustrated in FIG. 7, a service provider announces the learning target and the sensing data to be collected to a user who owns the autonomous mobile object 10 in the embodiment. The above announcement may be made, for example, as a part of an event for improving the performance of the autonomous mobile object 10.

At this time, the information processing server 20 according to the embodiment may perform control so that the announcement is made via, for example, an application or the like installed in an information processing terminal 30 owned by the user as illustrated in the upper left of the drawing.

Next, the user U who has referred to the announcement as described above causes the autonomous mobile object 10 owned by the user to collect the sensing data related to the learning target. For example, in the case where the learning target is a "flower," the autonomous mobile object 10 recognizes the utterance "Please take a photo of the flower" of the user U, and performs photographing using a learning target T as a subject. At this time, the autonomous mobile object 10 may extract the "flower" as a class name from the result of the semantic analysis of the utterance, and may store the same in association with image data. In addition, the autonomous mobile object 10 transmits the image data and the class name to the information processing server 20 on the basis of an instruction of the user.

Next, the information processing server 20 performs object recognition learning related to the "flower" by using image data P1 to Pn received from a plurality of autonomous mobile objects 10. At this time, the information processing server 20 may perform teacher learning using the class name received together with the image data P1 to Pn. On the other hand, the assignment of the class name need not necessarily be performed by the autonomous mobile object 10 automatically, but may be performed by, for example, the user U via the information processing terminal 30 or may be performed by the service provider after uploading. In addition, the class name such as the "flower" corresponding to the event may be automatically assigned to the image data uploaded during an event period. It should be noted that the designation of an object region in which the learning target is projected in the image data may be similarly performed by the user U or may be performed by the service provider after uploading.

In addition, at this time, the information processing server 20 according to the embodiment presents a progression status related to the recognition learning. For example, the information processing server 20 may perform control so that the total number of uploaded image data and the total number of autonomous mobile objects 10 that has collected the image data are presented to the user as a part of the progression status. According to the control, it is possible to cause the user to grasp that the provision of the sensing data directly contributes to improvement in the performance of the autonomous mobile object 10 and to promote the user to actively provide the data.

In addition, in the case where the recognition learning is completed, the communication unit 180 of the autonomous mobile object 10 downloads the generated latest dictionary for recognition from the information processing server 20. In addition, at this time, the communication unit 180 according to the embodiment downloads control data related to behavior executed by the autonomous mobile object 10 in the case where the learning target is recognized by a recognition process using the dictionary for recognition.

According to the above control, in the case where a recognition unit 130 recognizes the learning target by using the above dictionary for recognition, a motion control unit 150 can cause the autonomous mobile object 10 to execute new behavior on the basis of the above control data. For example, in the case of the example illustrated in FIG. 7, the motion control unit 150 may cause the autonomous mobile object 10 to perform a motion such as sniffing the "flower" on the basis of the downloaded control data.

As described above, in the case where the learning target T is recognized by using a dictionary for recognition generated as a result of learning and the dictionary for recognition, the autonomous mobile object 10 according to the embodiment can increase the recognizable targets and the behavior toward the targets by downloading the control data related to the behavior to be executed. In addition, since the user who has confirmed the behavior as described above can intuitively grasp the improvement in the performance of the autonomous mobile object 10, it is assumed that the sensing data is more actively provided thereafter, and it is expected that efficient securing of data is further promoted. Hereinafter, a configuration for realizing the above functions will be described in more detail.

1.4. Example of System Configuration

Figure 8:
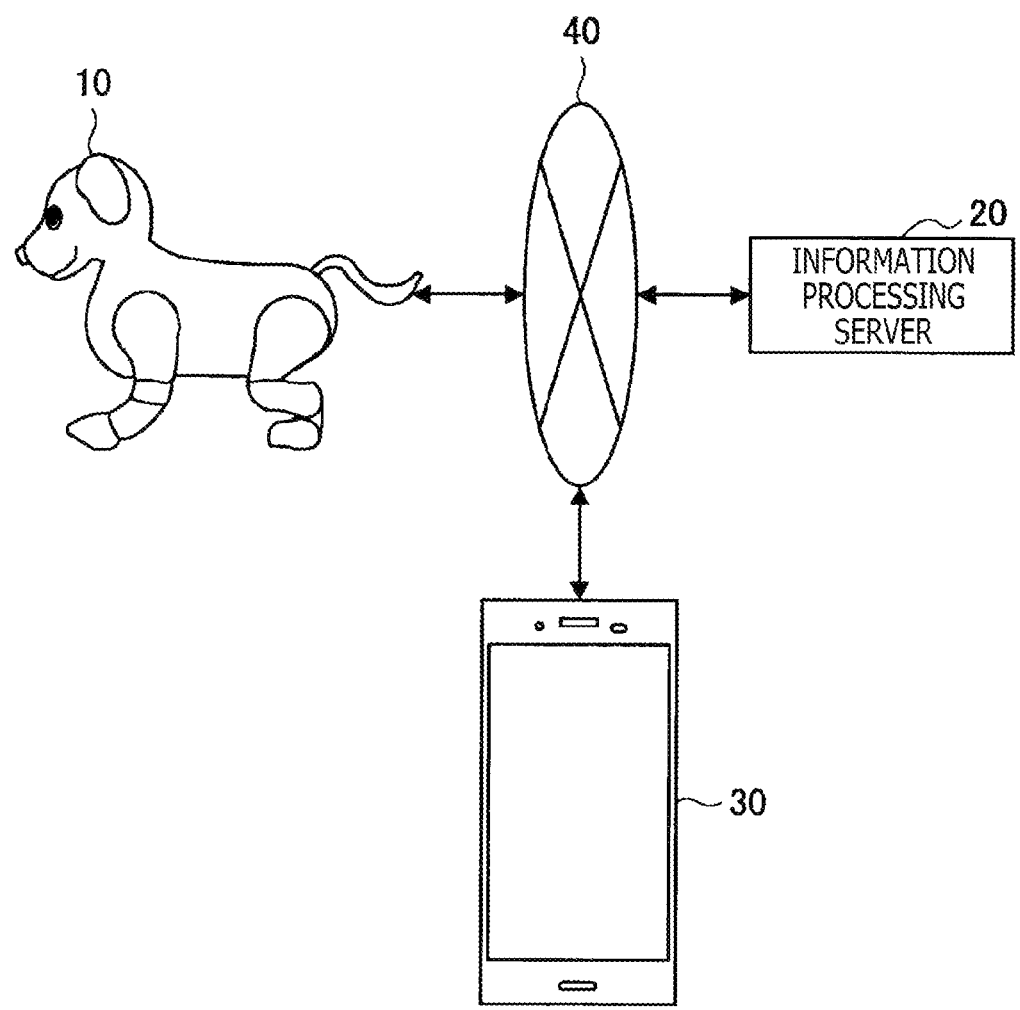
FIG. 8 is a diagram illustrating a configuration example of an information processing system according to the embodiment.

First, a configuration example of an information processing system according to the embodiment will be described. FIG. 8 is a diagram illustrating a configuration example of the information processing system according to the embodiment. As illustrated in FIG. 8, the information processing system according to the embodiment includes the autonomous mobile object 10, the information processing server 20, and the information processing terminal 30. In addition, the above configurations are connected to each other via a network 40.

(Autonomous Mobile Object 10)

The autonomous mobile object 10 according to the embodiment is an information processing apparatus that executes various kinds of recognition processes based on the collected sensing and autonomously selects and executes various motions according to situations. As described above, the autonomous mobile object 10 according to the embodiment of the present disclosure may be an autonomous mobile robot having, for example, a shape imitating an animal such as a human or a dog and a motion capability thereof.

(Information Processing Server 20)

The information processing server 20 according to the embodiment is an information processing apparatus that performs recognition learning related to the learning target by using the sensing data collected by a plurality of autonomous mobile objects 10. In addition, one of the features of the information processing server 20 according to the embodiment is to control presentation of the progression status related to the recognition learning.

(Information Processing Terminal 30)

The information processing terminal 30 according to the embodiment is an information processing apparatus owned by the user and displays various kinds of information such as an announcement of an event and the progression status related to the recognition learning on the basis of control by the information processing server 20. The information processing terminal 30 may perform the display as described above on, for example, a native application or a Web application. The information processing terminal 30 according to the embodiment may be, for example, a smartphone, a PC (Personal Computer), a tablet, or the like.

(Network 40)

The network 40 has a function of connecting the respective configurations described above to each other. The network 40 may include a public network such as the Internet, a telephone network, or a satellite communication network and various kinds of a LAN (Local Area Network), a WAN (Wide Area Network), and the like including Ethernet (registered trademark). In addition, the network 40 may include a leased line network such as an IP-VPN (Internet Protocol-Virtual Private Network). In addition, the network 40 may include a wireless communication network such as Wi-Fi (registered trademark) or Bluetooth (registered trademark).

The configuration example of the information processing system according to the embodiment has been described above. It should be noted that the above configuration described using FIG. 8 is only an example, and the configuration of the information processing system according to the embodiment is not limited to the example. The configuration of the information processing system according to the embodiment can be flexibly modified according to specifications and operations.

1.5. Example of Functional Configuration of Autonomous Mobile Object 10

Figure 9:
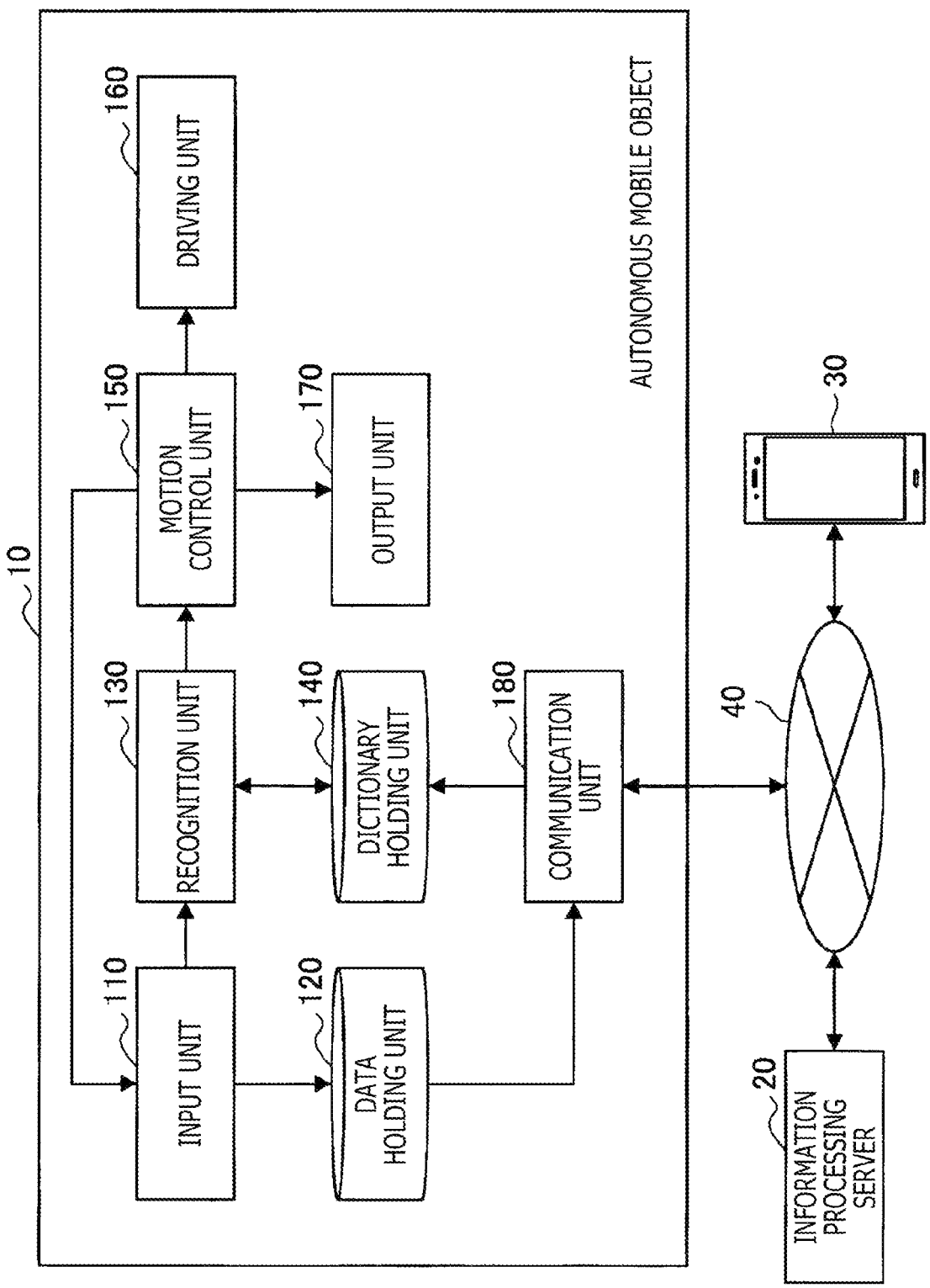
FIG. 9 is a block diagram illustrating an example of a functional configuration of the autonomous mobile object according to the embodiment.

Next, an example of a functional configuration of the autonomous mobile object 10 according to the embodiment will be described. FIG. 9 is a block diagram illustrating an example of a functional configuration of the autonomous mobile object 10 according to the embodiment. As illustrated in FIG. 9, the autonomous mobile object 10 according to the embodiment includes an input unit 110, a data holding unit 120, a recognition unit 130, a dictionary holding unit 140, a motion control unit 150, a driving unit 160, an output unit 170, and a communication unit 180.

(Input Unit 110)

The input unit 110 according to the embodiment has a function of collecting various sensing data related to the user, the autonomous mobile object 10, an object, and the surrounding environment. For this purpose, the input unit 110 includes various kinds of sensors illustrated in FIG. 1.

(Data Holding Unit 120)

The data holding unit 120 according to the embodiment stores information such as the sensing data collected by the input unit 110. For example, the data holding unit 120 according to the embodiment stores the sensing data related to a learning target and associated information and category information corresponding to the learning target in association with each other on the basis of control by the motion control unit 150. The above associated information includes, for example, information related to an area of the learning target in the image data and teacher data for learning such as a class name. In addition, the above category information includes a problem category (for example, a general object image or the like) related to recognition learning.

(Recognition Unit 130)

The recognition unit 130 according to the embodiment executes various kinds of recognition/inference processes on the basis of various kinds of sensing data collected by the input unit 110 and the dictionary for recognition held by the dictionary holding unit 140. The recognition unit 130 may perform the recognition/inference processes using, for example, Deep Neural Network.

In addition, one of the features of the recognition unit 130 according to the embodiment is to recognize a command of the user for instructing collection of sensing data. For example, as illustrated in FIG. 7, the recognition unit 130 conducts the semantic analysis for the utterance of the user, and recognizes voice commands such as "Please take a photo" and "Please post a photo of a flower."

(Dictionary Holding Unit 140)

The dictionary holding unit 140 according to the embodiment holds various kinds of dictionaries for recognition used by the recognition unit 130. The dictionary holding unit 140 according to the embodiment holds, for example, a pre-installed dictionary for recognition and the latest dictionary for recognition downloaded from the information processing server 20. The dictionary holding unit 140 according to the embodiment presents the latest dictionary for recognition appropriate for target recognition or the like in response to an inquiry from the recognition unit 130.

(Motion Control Unit 150)

The motion control unit 150 according to the embodiment controls a motion of the autonomous mobile object 10 on the basis of the result of the recognition/inference process by the recognition unit 130. The motion control unit 150 according to the embodiment causes the autonomous mobile object 10 to execute, for example, behavior corresponding to the object or the like recognized by the recognition unit 130.

In addition, the motion control unit 150 according to the embodiment causes the input unit 110 to execute collection of the sensing data on the basis of a command recognized by the recognition unit 130. At this time, in the case where the target sensing data is time-series data, the data collection by the input unit 110 may be controlled on the basis of a start or end instruction included in the command.

The motion control unit 150 according to the embodiment causes the dictionary holding unit 140 to store the sensing data collected by the input unit 110 on the basis of the above command in association with the associated information and command information corresponding to the learning target.

(Driving Unit 160)

The driving unit 160 according to the embodiment has a function of bending and stretching a plurality of joint portions of the autonomous mobile object 10 on the basis of control by the motion control unit 150. The motion control unit 150 drives the actuator 570 included in each joint portion in accordance with, for example, control data downloaded from the information processing server 20, so that predetermined behavior by the autonomous mobile object 10 is realized.

(Output Unit 170)

A function of outputting visual information and sound information on the basis of control by the motion control unit 150 according to the embodiment is provided. For this purpose, the output unit 170 includes the displays 510 and a speaker. The motion control unit 150 controls the expressions of the eyes by the displays 510 and the output of a cry by the speaker on the basis of, for example, the control data downloaded from the information processing server 20, so that predetermined behavior by the autonomous mobile object 10 is realized. In addition, the output unit 170 according to the embodiment may include various kinds of output apparatuses for outputting infrared signals, Bluetooth (registered trademark) signals, Wi-Fi signals, and the like, which are used for cooperation with various kinds of IoT devices and other autonomous mobile objects 10.

(Communication Unit 180)

The communication unit 180 according to the embodiment performs information communication with the information processing server 20 and the information processing terminal 30 via the network 40. For example, the communication unit 180 according to the embodiment transmits the sensing data collected by the input unit 110 to the information processing server 20. In addition, for example, the communication unit 180 according to the embodiment receives the latest dictionary for recognition and control data related to new behavior from the information processing server 20.

The example of the functional configuration of the autonomous mobile object 10 according to the embodiment has been described above. It should be noted that the above configuration described using FIG. 9 is only an example, and the functional configuration of the autonomous mobile object 10 according to the embodiment is not limited to the example. The functional configuration of the autonomous mobile object 10 according to the embodiment can be flexibly modified according to specifications and operations.

1.6. Example of Functional Configuration of Information Processing Server 20

Figure 10:
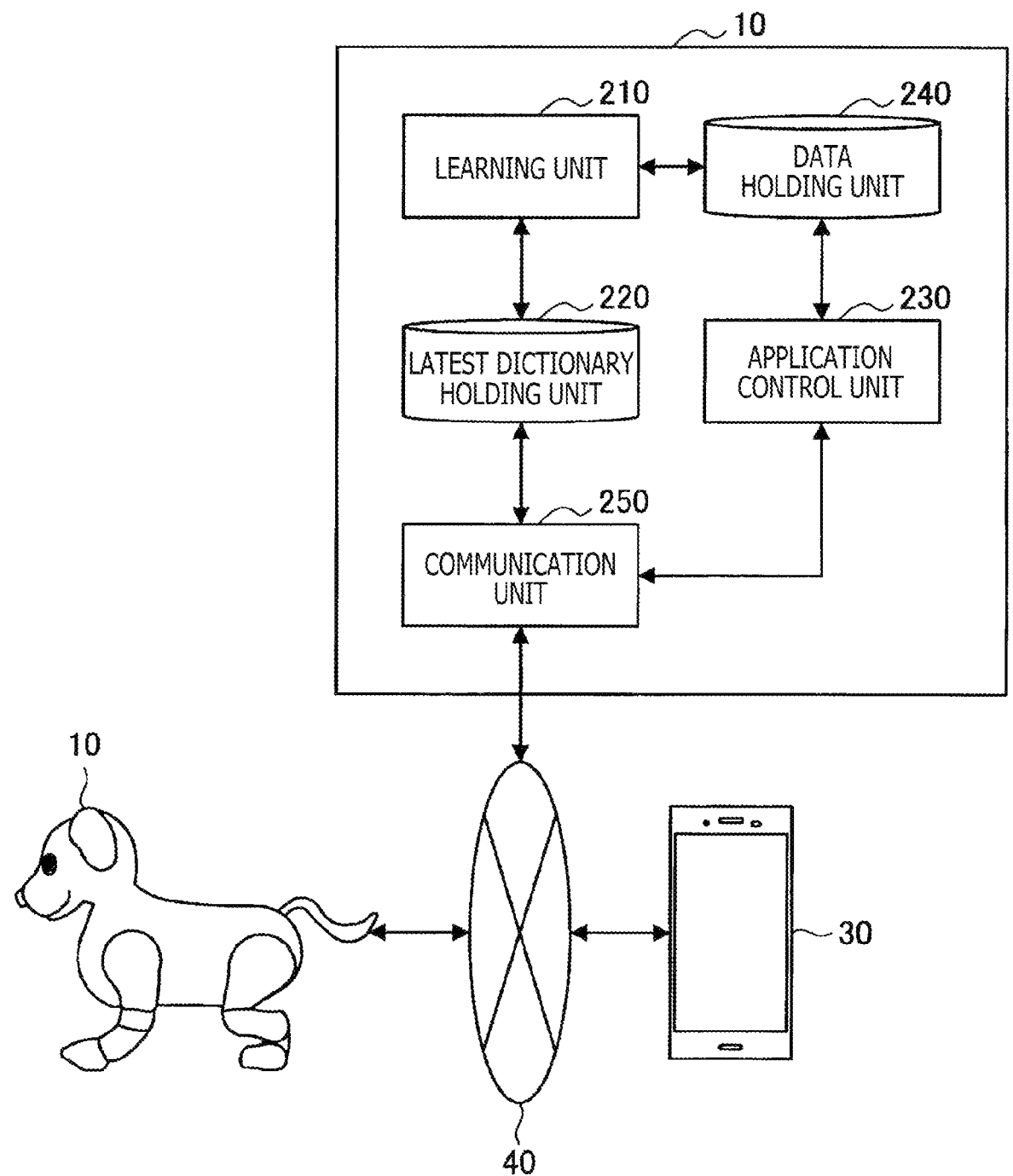
FIG. 10 is a block diagram illustrating an example of a functional configuration of an information processing server according to the embodiment.

Next, an example of a functional configuration of the information processing server 20 according to the embodiment will be described. FIG. 10 is a block diagram illustrating an example of a functional configuration of the information processing server 20 according to the embodiment. As illustrated in FIG. 10, the information processing server 20 according to the embodiment includes a learning unit 210, a latest dictionary holding unit 220, an application control unit 230, a data holding unit 240, and a communication unit 250.

(Learning Unit 210)

The learning unit 210 according to the embodiment performs recognition learning related to a predetermined learning target by using the sensing data collected by a plurality of autonomous mobile objects 10. The learning unit 210 according to the embodiment may perform the recognition learning using, for example, Deep Neural Network.

The learning unit 210 may execute the learning process, for example, at a regular interval such as once a day, or may execute the learning process every time the sensing data is uploaded. In addition, the learning unit 210 may execute the learning process when an event related to collection of the sensing data is completed. The learning unit 210 causes the latest dictionary holding unit 220 to store the dictionary for recognition generated as a result of the learning at the timing as described above.

It should be noted that the function of the learning unit 210 according to the embodiment can be replaced by manual operations. For example, after a developer downloads the sensing data stored in the data holding unit 240 at the time of completion of an event, the developer may execute the recognition learning and the generation of the dictionary for recognition by using a PC or the like and may upload the dictionary for recognition to the latest dictionary holding unit 220.

(Latest Dictionary Holding Unit 220)

The latest dictionary holding unit 220 according to the embodiment stores the latest dictionary for recognition generated by the learning unit 210.

(Application Control Unit 230)

The application control unit 230 according to the embodiment controls an application operated by the user via the information processing terminal 30. The application control unit 230 according to the embodiment controls, for example, an announcement of an event related to collection of the sensing data on the application.

In addition, the application control unit 230 according to the embodiment performs display control and upload control of the sensing data collected by the autonomous mobile object 10 on the application.

In addition, the application control unit 230 according to the embodiment controls presentation of the progression status related to the recognition learning by the learning unit 210 on the application. The function of the application control unit 230 according to the embodiment will be described separately in detail later.

(Data Holding Unit 240)

The data holding unit 240 according to the embodiment stores the sensing data uploaded from the autonomous mobile object 10. The data holding unit 240 according to the embodiment may be configured using, for example, an individual data holding unit for storing the sensing data on an autonomous mobile object 10 or user basis, and a posted data holding unit for storing the sensing data uploaded (posted) by all users.

In this case, the individual data holding unit may deliver the corresponding sensing data to the posted data holding unit on the basis of control by the application control unit 230. In addition, the application control unit 230 provides information such as a list and the total number of posted sensing data on an autonomous mobile object 10 or user basis in response to an inquiry from the application control unit 230.

(Communication Unit 250)

The communication unit 250 according to the embodiment performs information communication with the autonomous mobile object 10 and the information processing terminal 30 via the network 40. For example, the communication unit 250 according to the embodiment receives the sensing data from the autonomous mobile object 10. In addition, for example, the communication unit 250 according to the embodiment transmits a control signal generated by the application control unit 230 to the information processing terminal 30.

The example of the functional configuration of the information processing server 20 according to the embodiment has been described above. It should be noted that the above configuration described using FIG. 10 is only an example, and the example of the functional configuration of the information processing server 20 according to the embodiment is not limited to the example. For example, each of the above-described configurations can be realized by being dispersed in different apparatuses. The functional configuration of the information processing server 20 according to the embodiment can be flexibly modified according to specifications and operations.

1.7. Details of Function

Next, the functions of the autonomous mobile object 10 and the information processing server 20 according to the embodiment will be described in more detail. First, an upload (posting) function of sensing data according to the embodiment will be described.

FIG. 11 is a diagram for describing posting of sensing data according to the embodiment. FIG. 11 illustrates an example of an application screen displayed on the information processing terminal 30 owned by the user. It should be noted that FIG. 11 illustrates an example in which the learning target is a "flower" and the sensing data is an image of the "flower."

In this case, for example, as illustrated on the left side in the drawing, a list of image data photographed by the autonomous mobile object 10 is displayed on the application screen. It should be noted that six pieces of image data P1 to P6 are exemplified in FIG. 11. At this time, as the image data P1, a highlight display, a mark, a phrase, or the like is given to the image data P that has already been posted, so that the application control unit 230 may indicate that the data has already been posted.

In addition, when the user selects the image data P2 of the "flower" that has not already been posted in the list, the display screen is shifted to an enlarged display screen as illustrated on the right side in the drawing, and the image data P2 can be uploaded to the information processing server 20 by pressing a button such as "post." At this time, the user may designate a region where the "flower" appears in the image data P2 or may assign a class name.

Figure 12:
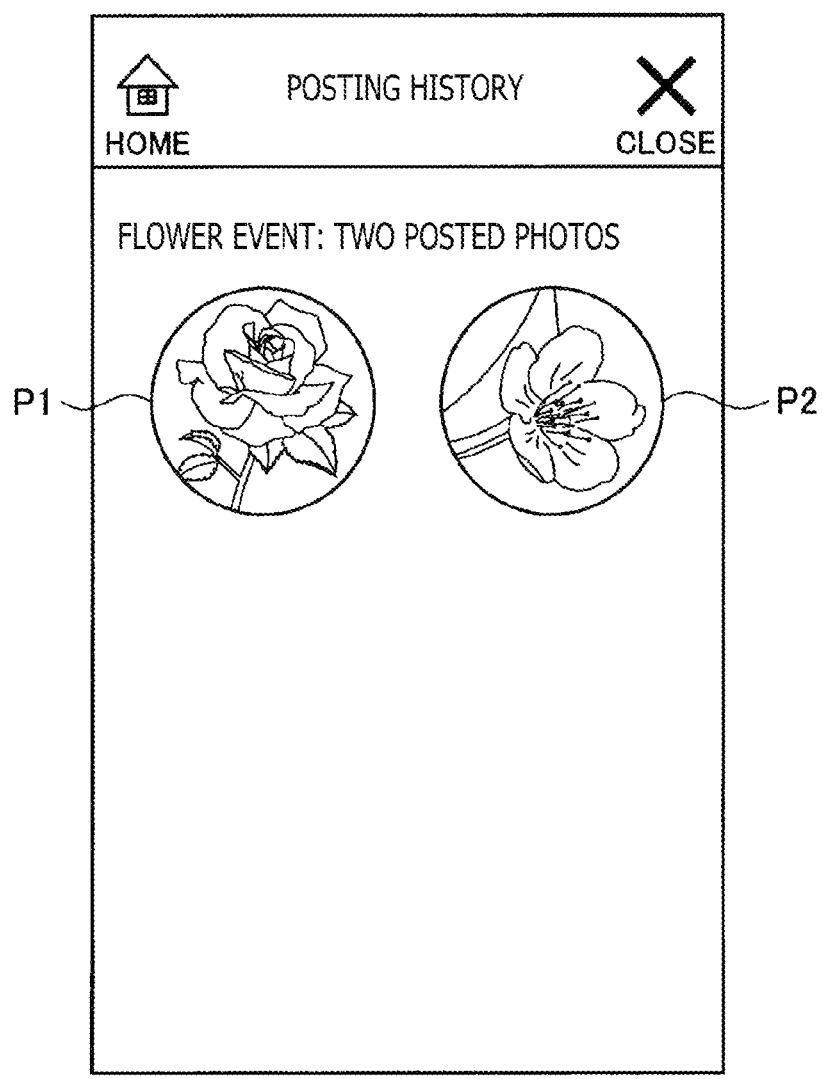
FIG. 12 is an example of a posting history screen according to the embodiment.

In addition, FIG. 12 is an example of a posting history screen according to the embodiment. For example, as illustrated in FIG. 12, the application control unit 230 may perform control so that a list of sensing data posted by the user can be confirmed on the application.

Next, the presentation of the progression status of the recognition learning according to the embodiment will be described. As described above, one of the features of the application control unit 230 according to the embodiment is to control the presentation of the progression status related to the recognition learning by the learning unit 210.

FIG. 13 is an example of a progression status presentation screen according to the embodiment. As illustrated in FIG. 13, the application control unit 230 according to the embodiment may display information such as the total number of posted sensing data, the total number of autonomous mobile objects 10 that has collected the sensing data, and the period and elapsed days of the event as one of the progression statuses.

In addition, the application control unit 230 according to the embodiment may control the presentation of the degree of contribution of the user to the recognition learning. In the case of the example illustrated in FIG. 13, the application control unit 230 displays information of users who posted 50 or more or 30 or more of the sensing data and the autonomous mobile objects 10 owned by the users as one of the degrees of contribution. As described above, the degree of contribution according to the embodiment may be determined on the basis of the numbers of sensing data provided by the users. It should be noted that the application control unit 230 may display the degrees of contribution in a ranking format.

According to the above-described control by the application control unit 230, the user can intuitively grasp the progress of the recognition learning and the contribution of the user to the recognition learning, and it is expected to more actively post the sensing data.

It should be noted that the presentation of the progression status according to the embodiment is not limited to the above example. The application control unit 230 according to the embodiment may display the recognition performance related to the recognizer in the middle of learning as one of the progression statuses.

Figure 14:
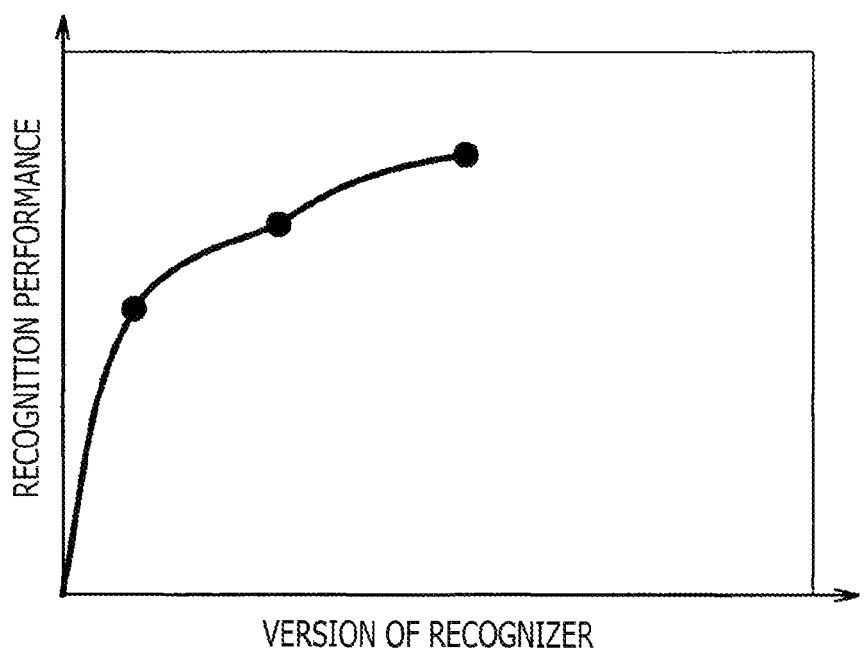
FIG. 14 is a diagram illustrating a display example of recognition performance related to a recognizer in the middle of learning according to the embodiment.

FIG. 14 is a diagram illustrating a display example of the recognition performance related to the recognizer in the middle of learning according to the embodiment. For example, the application control unit 230 according to the embodiment can control such that a graph related to the recognition performance for each version (a day, a learning cycle, or the like) of the recognizer is displayed on the application as illustrated in the drawing.

The above recognition performance includes, for example, a correct answer rate, accuracy, a reproduction rate, an F value, or the like, each of which is a general performance index in machine learning.

According to the display as described above, the user can intuitively and accurately grasp the performance of the recognizer in the middle of learning.

In addition, the progression status according to the embodiment may include a recognition result obtained in the case where the sensing data is input to the recognizer in the middle of learning. For example, the application control unit 230 according to the embodiment may input the input data (sensing data) designated by the user to the recognizer in the middle of learning, and may display the obtained recognition result on the application. That is, the user can input optional sensing data to the recognizer in the middle of learning, and can test the performance of the recognizer.

Figure 15:
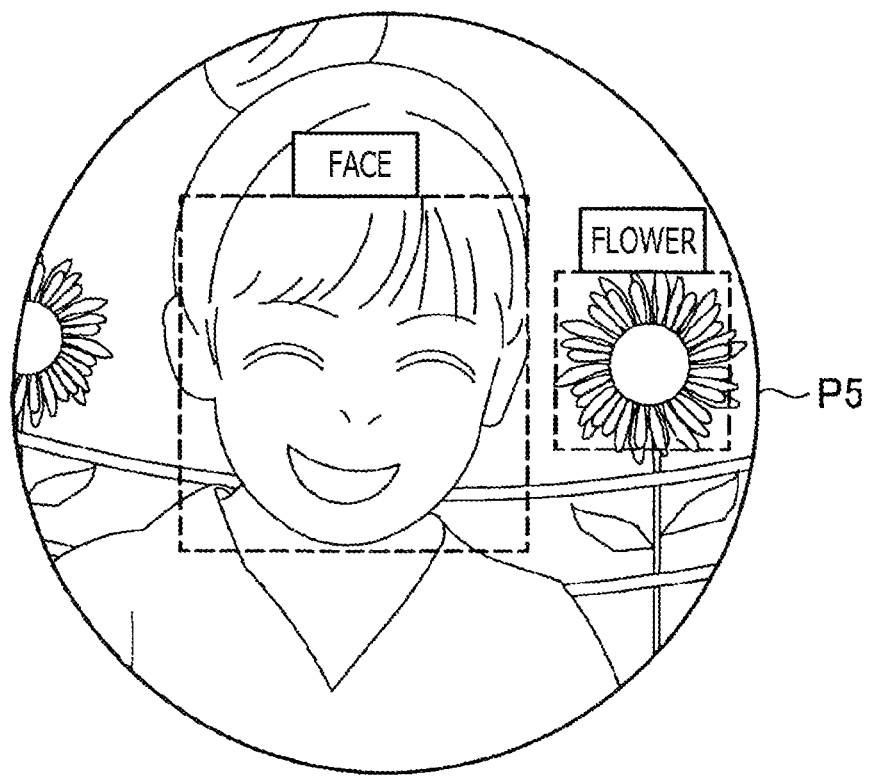
FIG. 15 is a diagram for describing a trial of the recognizer according to the embodiment.

FIG. 15 is a diagram for describing a trial of the recognizer according to the embodiment. In the example illustrated in FIG. 15, a display example of a recognition result obtained in the case where the user designates the image data P5 illustrated in FIG. 11 is illustrated. For example, in the case of general object recognition, rectangles indicating regions of recognized objects and recognized class names may be displayed while being overlapped with the image data P on the application as illustrated in the drawing.

According to the function as described above, the user can test whether or not the image data or the like that the user has caused the autonomous mobile object 10 to photograph is correctly recognized by the recognizer that is currently learning, and the performance of the recognizer can be more closely grasped.

In addition, the application control unit 230 may display examples of the recognition results obtained in the case where the sensing data is input to the recognizer in the middle of learning for each case. FIG. 16 is a diagram for describing a case display of the recognition results according to the embodiment.

In the case of the example illustrated in FIG. 16, the application control unit 230 displays image data in which the "flowers" as the learning target have been recognized by the recognizer in the middle of learning, image data in which the "flowers" have not been recognized, and image data in which erroneous targets have been recognized as the "flowers" on the application. It should be noted that the application control unit 230 may control the display for each version of the recognizer.

In addition, the degree of contribution of the user according to the embodiment may be determined on the basis of the recognition results as described above. In general, in machine learning, even if only a large amount of recognizable data is collected, the effect on improvement in performance is not high, and collection of data in which false recognition or no detection occurs contributes to improvement in performance.

Therefore, the application control unit 230 may assign more points to the user who posted the image data in which false recognition or no detection occurred, and may determine the degree of contribution of the user on the basis of the points.

For example, the application control unit 230 controls such that a difference is generated in the degrees of contribution of the users by assigning five points to the image data in which no detection occurs and assigning 10 points to the image data in which false recognition occurs while assigning one point to one piece of image data that is successfully recognized. It should be noted that the importance of no detection or false recognition may be determined on the basis of uses and specifications, such as which error is to be suppressed in the recognizer.

According to the control as described above, the user who has contributed to improvement in the performance of the recognizer is properly evaluated, and it is expected that the user who wants to acquire more points posts more sensing data contributing to improvement in performance.

The presentation of the progression status of the recognition learning according to the embodiment and the degree of contribution of the user has been described above. It should be noted that although the case where the learning unit 210 according to the embodiment performs the object recognition learning using the image data collected by the autonomous mobile object 10 has been described above as a main example, the recognition learning according to the embodiment is not limited to the example.

The learning target according to the embodiment widely includes, for example, a predetermined speech and action of the user, a predetermined scene (space), a predetermined terrain, and the like in addition to a predetermined object.

Figure 17:
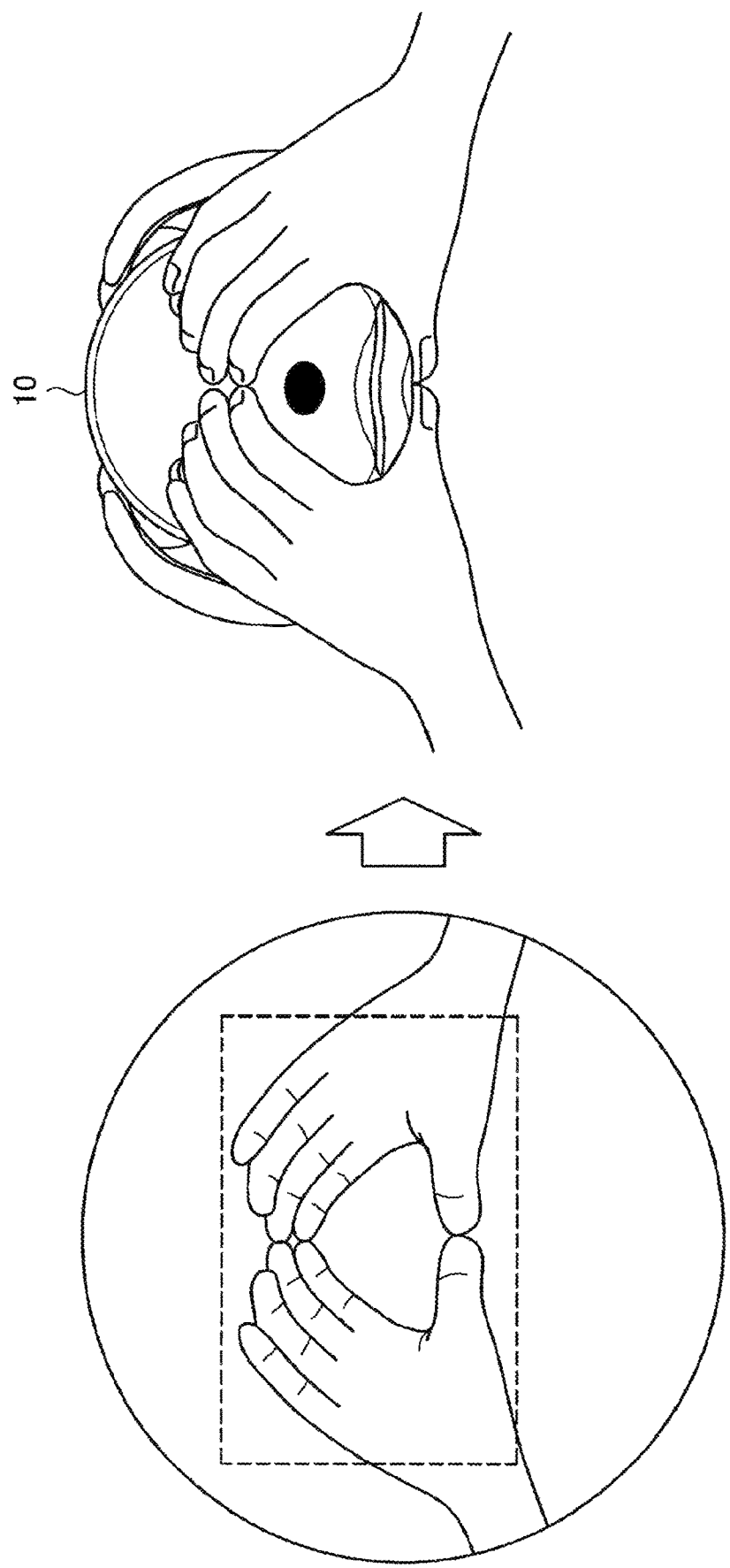
FIG. 17 is a diagram illustrating an example of a case where a learning target according to the embodiment is a predetermined speech and action of a user.

FIG. 17 is a diagram illustrating an example of a case where the learning target according to the embodiment is a predetermined speech and action of the user. The predetermined speech and action of the user includes, for example, a predetermined hand shape. For example, as illustrated in FIG. 17, the learning target according to the embodiment may be a hand shape formed when making a loop. In this case, the autonomous mobile object 10 can recognize the above hand shape by downloading the dictionary for recognition generated as a result of the recognition learning based on the image data obtained by photographing the above hand shape.

In addition, the autonomous mobile object 10 may download control data for executing the behavior corresponding to the above hand shape from the information processing server 20. The above behavior includes, for example, a motion of sticking the tip of the nose into the loop formed with the hands.

It should be noted that the hand shape is not limited to the example illustrated in FIG. 17. For example, the information processing server 20 may perform the recognition learning related to a hand shape forming a rectangle with both hands to generate the dictionary for recognition. The behavior corresponding to the hand shape includes, for example, photographing of image data or the like. In addition, for example, the information processing server 20 may learn a hand shape related to a stretched hand. The behavior corresponding to the hand shape includes, for example, a motion such as pawing.

In addition, the predetermined speech and action of the user according to the embodiment widely includes a predetermined utterance, a predetermined expression, a predetermined gesture, a predetermined action to the autonomous mobile object 10, and the like in addition to the hand shape.

For example, for the sensing data related to the predetermined expression, a face detector or the like is used together so that a process up to clipping of a face portion can be automatically performed. As similar to the case of a general object, as the designation of the class name, use of the semantic analysis result of the utterance of the user, input of the user on the application, input by the developer, and automatic assignment accompanying the event period are assumed.

In addition, for example, in the case of collecting the sensing data related to the predetermined gesture, the autonomous mobile object 10 gives start and end signals after the user gives a start signal, and the sensing data during the period may be collected. Alternatively, all the start and end may be designated by the user. In addition, it is also possible to collect the sensing data before and after the user gives a predetermined utterance such as "come." In this case, for example, it is possible to perform a motion equivalent to the behavior toward the utterance "come" in response to beckoning of the user.

In addition, the sensing data related to the predetermined action to the autonomous mobile object 10 includes, for example, acceleration data or gyro data (motion data) in the case where the user strokes the autonomous mobile object 10 while giving an utterance such as "good boy/girl." In this case, the sensing data before and after the above utterance may be collected as data of a class "stroking," or the sensing data may be collected on the basis of start/end signals by the user or the autonomous mobile object 10. The behavior corresponding to the motion data includes, for example, a motion such as being quiet when hugged, rejoicing in the case of being praised, or reflecting in the case of being scolded.

The concrete examples have been described above in the case where the learning target according to the embodiment is a predetermined speech and action of the user. Next, concrete examples in the case where the learning target according to the embodiment is a predetermined scene or terrain will be described.

The scenes according to the embodiment refer to various spaces. In this case, examples of the sensing data include, for example, image data obtained by photographing a predetermined space, sound data collected in a predetermined space, and the like. In the case where the learning target is the predetermined scene, the assignment of the class name may be executed by the above-described various kinds of methods, or a method in which the class name is entered to a specific point on a map displayed on the application and the entered class name is assigned to image data photographed after the autonomous mobile object 10 moves to the point can be employed.

In addition, the terrain according to the embodiment includes, for example, a floor material, a rug, stairs, an edge, or the like. For example, according to the learning related to the terrain as described above, the autonomous mobile object 10 can behave such as walking suitable for a floor material or a rug, actively lying down on a soft place, or avoiding a place (dangerous place) where it is difficult to walk.

The learning targets according to the embodiment have been described above with the concrete examples. It should be noted that other concrete examples related to the general objects and scenes are described in the following Table 1 and Table 2, respectively.

TABLE 1

| Uses | Learning targets | Values of behavior etc. |
|---|---|---|
| Evolution of photographing function | Feet (legs) of human | Comes to not take only photos of legs |
| | Flowers | Comes to take photos of flowers when finding them |
| Enhancement of basic performance | Heaters, fireplaces | Comes to not approach heat sources |
| | Decorated autonomous mobile objects | Becomes able to recognize autonomous mobile objects even when they are decorated |
| | Vacuum cleaners | Avoids collision with vacuum cleaners |
| | Shoes | Fools around with shoes or comes to not fool around with shoes |
| | Seasonal items (Halloween pumpkins etc.) | Comes to move in tandem with behavior dependent on seasons |
| Addition of toys and playthings | Toy balls | The autonomous mobile object comes to be able to kick things other than predetermined balls |

TABLE 1-continued

| Uses | Learning targets | Values of behavior etc. |
|---|---|---|
| | Dolls, stuffed toys | Comes to play with dolls or stuffed toys when finding them |
| | Tambourines, castanets | The autonomous mobile object comes to conduct a simple musical instrument performance |
| | Smartphones | Plays by tapping smartphones when finding them |
| | PET bottles | Tries to knock down PET bottles when finding them |
| | Socks | Comes to play with socks in its mouth |
| | Blankets | Comes to play with blankets in its mouth |
| | Tissue paper | Comes to exhibit behavior such as pulling out tissue paper |
| Evolution of dog-likeness | Food, fruit | Comes to exhibit signs of "looking delicious," etc. or behavior such as sniffing |
| | Food dishes | Comes to exhibit behavior related to an expression such as "eating food" |
| | Leashes, leads | Comes to exhibit behavior related to an expression such as "wanting to go out together!" |
| | Bags | Comes to exhibit behavior related to an expression such as "is the master going somewhere?" |
| | Beds (plus something: the user is lying down) | The autonomous mobile object comes to wake the master up |
| | Sofas (plus something: the user is lying down) | The autonomous mobile object comes to approach a sofa to relax together |
| Evolution of staying close to life | Books | Comes to exhibit behavior related to an expression such as "let's read a book together" |
| | Liquor bottles | Comes to exhibit behavior related to an expression such as "let's drink together" or to stay with the master having an evening drink |
| Equipment cooperation | Logos | Rejoices when finding the own product. Activates the found own product |
| Special use | Characters | Comes to read alphabets or English words (for example, sits when finding a word "sit") |

TABLE 2

| Uses | Learning targets | Values of behavior etc. |
|---|---|---|
| Enhancement of basic performance | Places where charge stations are placed | Improvement in performance of returning to a charge station |
| Crisis avoidance | Bathrooms | The autonomous mobile object comes to not approach a bathroom |
| | Doors | The autonomous mobile object comes to not sit around a door |

TABLE 2-continued

| Uses | Learning targets | Values of behavior etc. |
|---|---|---|
| | Inside of car | Comes to not move around in a car<br>Keeps a balance, like surfing, inside a swaying car |
| | Bicycle baskets | Comes to not move around in a bicycle basket |
| Enjoying changes in action according to whereabouts | Kitchens | The autonomous mobile object exhibits behavior such as being hungry when it enters the kitchen |
| | Entrances | Comes to go to the entrance when saying "welcome" to the autonomous mobile object<br>Exhibits behavior such as waiting for the user at the entrance |
| | Toilets | Exhibits behavior such as marking near a toilet |
| | By the window | Daydreams toward the outside by the window |
| | Corridors | Runs down a long corridor at a high speed |
| | Parks | Gets excited when taken to a park |
| | Outdoor in general | Looks comfortable when taken to the outside |
| | Bedrooms | Seems to be useful for watching |

Next, setting of the learning target according to the embodiment will be supplemented. The case where the service provider sets the learning target has been described above as a main example, but the setting of the learning target according to the embodiment is not limited to the example.

Figure 18:
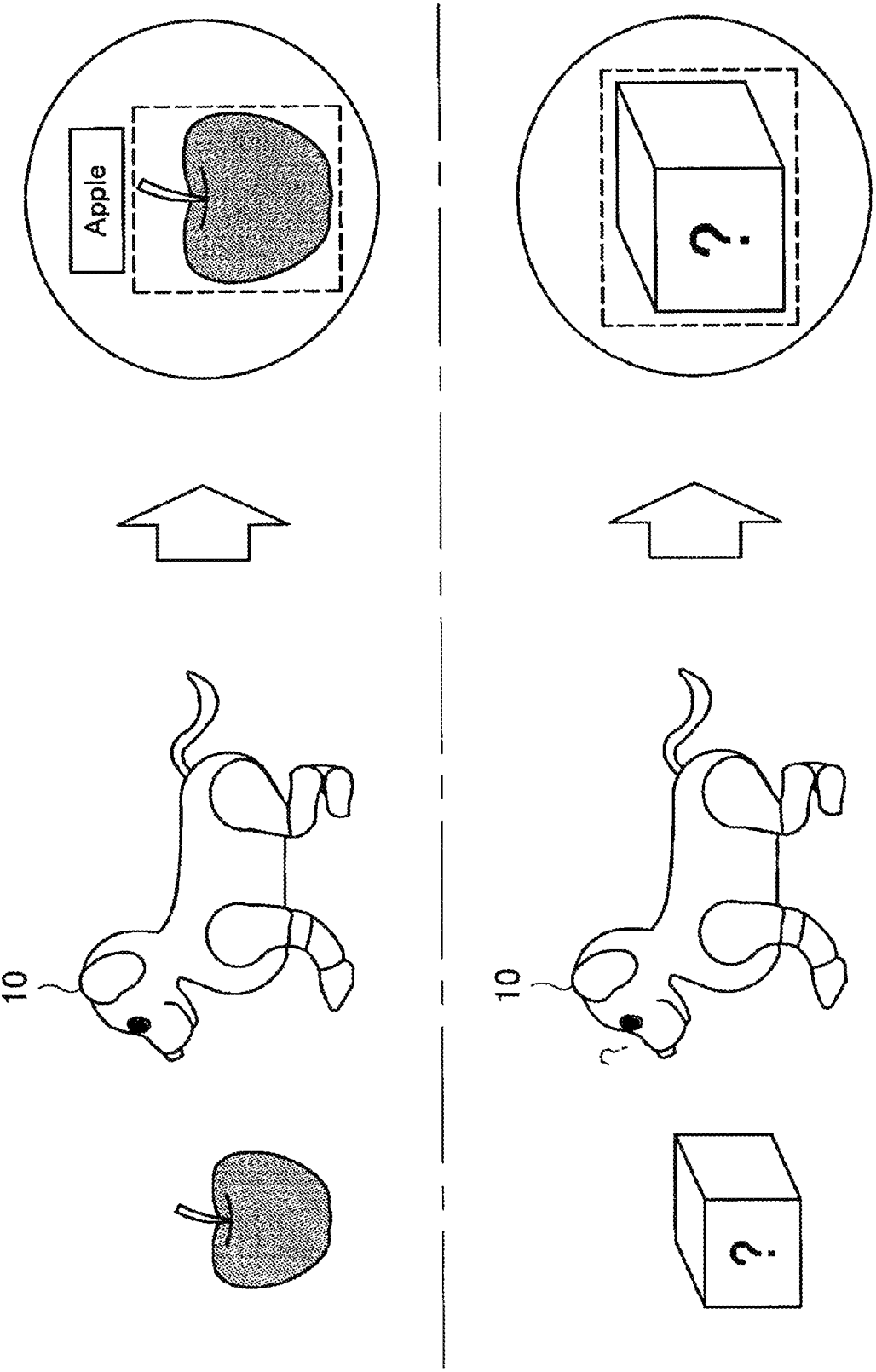
FIG. 18 is a diagram for describing a setting example of the learning target according to the embodiment.

FIG. 18 is a diagram for describing a setting example of the learning target according to the embodiment. The learning target according to the embodiment may be, for example, an object that the user wants the autonomous mobile object 10 to recognize. In this case, as illustrated on the upper side in the drawing, the user assigns, on the application, a rectangle indicating an object region and a class name to the image data obtained by photographing the object to be recognized by the autonomous mobile object 10, and uploads, that is, posts the data to the information processing server 20. It should be noted that, as described above, the object region may be designated by the service provider after posting.

The service provider may set, for example, an object or the like for which a certain number or more of postings have been made as an official learning target among the learning target candidates posted by the users. Alternatively, the service provider may set, as the official learning target, a learning target candidate for which votes have been collected in the user vote or a learning target candidate with high feasibility. It should be noted that after setting the learning target, the service provider may announce the event as described above in order to further secure the sensing data.

In addition, the learning target according to the embodiment may be any object that the current autonomous mobile object 10 cannot distinguish. For example, as illustrated on the lower side in the drawing, even in the case of an indistinguishable object, the autonomous mobile object 10 can recognize that some object (lump) is present in front thereof on the basis of image analysis, distance information, or the like. At this time, the autonomous mobile object 10 may photograph the above object (lump), and may upload the image data to the information processing server 20 automatically or after obtaining the approval of the user on the application.

In this case, the service provider may employ an object determined to contribute to improvement in the performance of the autonomous mobile object 10 as a learning target after confirming the uploaded image data. Alternatively, the service provider may classify and cluster the uploaded images related to the object, may present the information to the users, and may determine the learning target on the basis of the result of the user vote.

1.8. Processing Flow

Figure 19:
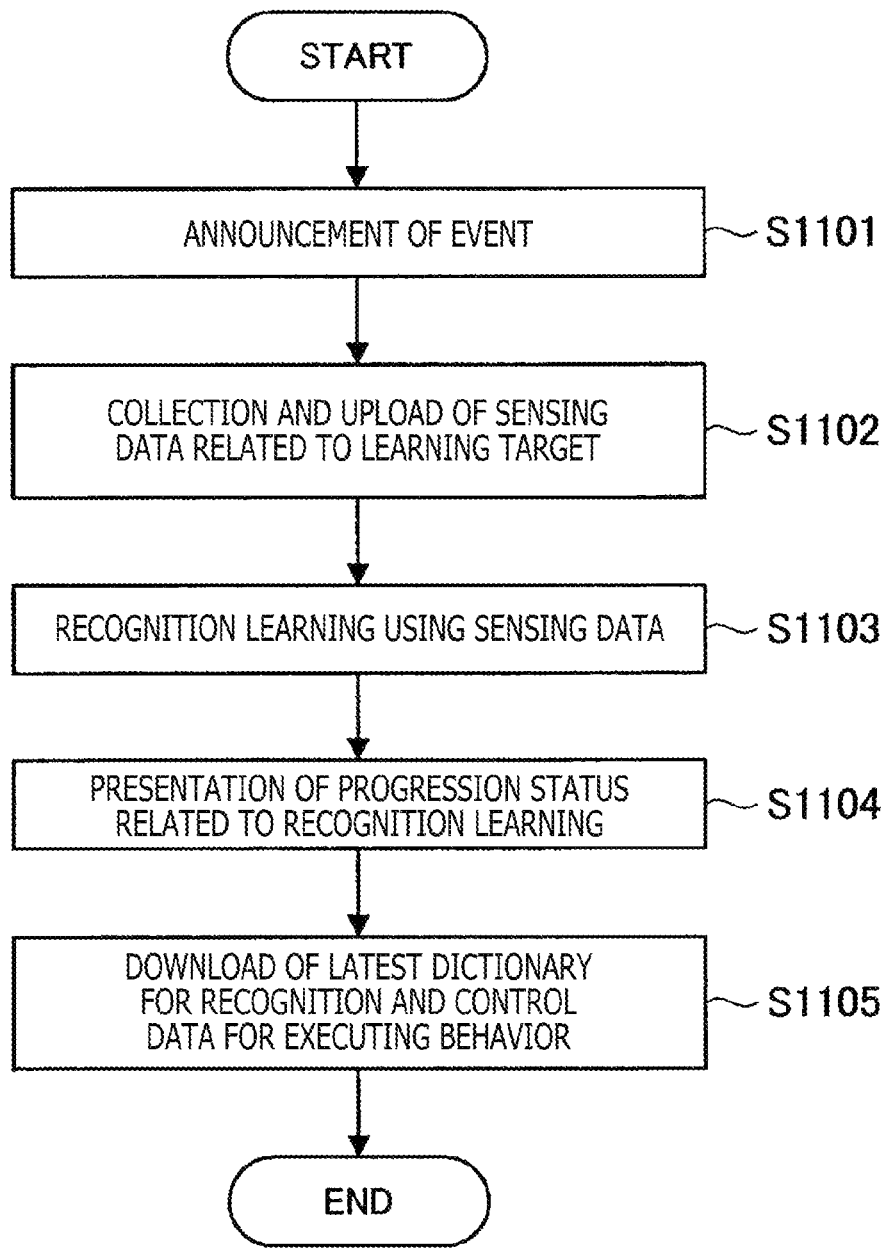
FIG. 19 is a flowchart illustrating a processing flow of the information processing system according to the embodiment.

Next, a processing flow of the information processing system according to the embodiment will be described in detail. FIG. 19 is a flowchart illustrating a processing flow of the information processing system according to the embodiment.

Referring to FIG. 19, first, the application control unit 230 of the information processing server 20 controls an announcement of an event related to collection of sensing data (S1101).

Next, the autonomous mobile object 10 collects the sensing data related to the learning target on the basis of a command of the user and uploads the sensing data to the information processing server 20 (S1102).

Next, the learning unit 210 of the information processing server 20 performs recognition learning related to the learning target by using the uploaded sensing data (S1103).

Next, the application control unit 230 controls presentation of the progression status related to the recognition learning by the learning unit 210 (S1104).

In addition, in the case where the recognition learning is completed, the autonomous mobile object 10 downloads the latest dictionary for recognition and control data for executing behavior corresponding to the learning target from the information processing server 20 (S1105).

2. Example of Hardware Configuration of Information Processing Server 20

Next, an example of a hardware configuration of the information processing server 20 according to the embodiment of the present disclosure will be described. FIG. 20 is a block diagram illustrating an example of a hardware configuration of the information processing server 20 according to the embodiment of the present disclosure. As illustrated in FIG. 20, the information processing server 20 has, for example, a processor 871, a ROM 872, a RAM 873, a host bus 874, a bridge 875, an external bus 876, an interface 877, an input apparatus 878, an output apparatus 879, a storage 880, a drive 881, a connection port 882, and a communication apparatus 883. It should be noted that the hardware configuration illustrated herein is an example, and some constitutional elements may be omitted. In addition, constitutional elements other than those illustrated herein may also be included.

(Processor 871)

The processor 871 functions as, for example, an arithmetic processing apparatus or a control apparatus, and controls the entire or some operations of the respective constitutional elements on the basis of various kinds of programs recorded in the ROM 872, the RAM 873, the storage 880, or a removable recording medium 901.

(ROM 872, RAM 873)

The ROM 872 is means for storing a program to be read into the processor 871, data to be used for calculation, and the like. The RAM 873 temporarily or permanently stores, for example, a program to be read into the processor 871, various kinds of parameters to be appropriately changed when the program is executed, and the like.

(Host Bus 874, Bridge 875, External Bus 876, Interface 877)

The processor 871, the ROM 872, and the RAM 873 are connected to each other via the host bus 874 capable of, for example, high-speed data transmission. On the other hand, the host bus 874 is connected to, for example, the external bus 876 having a relatively low data transmission speed via the bridge 875. In addition, the external bus 876 is connected to various constitutional elements via the interface 877.

(Input Apparatus 878)

As the input apparatus 878, for example, a mouse, a keyboard, a touch panel, buttons, switches, levers, and the like are used. Further, as the input apparatus 878, a remote controller capable of transmitting a control signal by using infrared rays or other radio waves is used in some cases. In addition, the input apparatus 878 includes a voice input apparatus such as a microphone.

(Output Apparatus 879)

The output apparatus 879 is, for example, a display apparatus such as a CRT (Cathode Ray Tube), an LCD, or an organic EL, an audio output apparatus such as a speaker or a headphone, a printer, a cellular phone, a facsimile, or the like, and is an apparatus capable of visually or auditorily notifying a user of acquired information. In addition, the output apparatus 879 according to the present disclosure includes various vibration devices capable of outputting tactile stimulation.

(Storage 880)

The storage 880 is an apparatus for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is, for example, an apparatus for reading information recorded in the removable recording medium 901 such as a magnetic disk, an optical disk, a magneto-optical disk, or a semiconductor memory, or for writing information into the removable recording medium 901.

(Removable Recording Medium 901)

The removable recording medium 901 is, for example, a DVD medium, a Blu-ray (registered trademark) medium, an HD DVD medium, various kinds of semiconductor storage media, or the like. It is obvious that the removable recording medium 901 may be, for example, an IC card on which a non-contact IC chip is mounted, electronic equipment, or the like.

(Connection Port 882)

The connection port 882 is, for example, a USB (Universal Serial Bus) port, an IEEE 1394 port, an SCSI (Small Computer System Interface), an RS-232C port, or a port for connecting external connection equipment 902 such as an optical audio terminal.

(External Connection Equipment 902)

The external connection equipment 902 is, for example, a printer, a portable music player, a digital camera, a digital video camera, an IC recorder, or the like.

(Communication Apparatus 883)

The communication apparatus 883 is a communication device for connecting to a network, for example, a communication card for a wired or wireless LAN, Bluetooth (registered trademark), or WUSB (Wireless USB), a router for optical communication, a router for ADSL (Asymmetric Digital Subscriber Line), various kinds of modems for communication, or the like.

3. Summary

As described above, the autonomous mobile object 10 according to the embodiment of the present disclosure includes the communication unit 180 that transmits the collected sensing data to the information processing server 20. In addition, one of the features of the communication unit 180 according to the embodiment of the present disclosure is to transmit the sensing data related to a predetermined learning target to the information processing server 20 and to receive the dictionary for recognition generated by the recognition learning using the sensing data collected by a plurality of autonomous mobile objects 10 and related to the above learning target.

In addition, one of the features of the information processing server 20 (described as an information processing apparatus in some cases) according to the embodiment of the present disclosure is to include the application control unit 230 (simply described as a control unit in some cases) for controlling the presentation of the progression status related to the recognition learning for generating the dictionary for recognition used for the autonomous mobile object 10.

According to the above configuration, it is possible to efficiently collect the sensing data used for the recognition learning and to increase recognizable targets.

Although the preferred embodiment of the present disclosure has been described above in detail with reference to the accompanying drawings, the technical scope of the present disclosure is not limited to such examples. It is apparent to a person with ordinary skill in the art of the present disclosure that various kinds of modified examples or correction examples can be achieved within the category of the technical idea described in the claims, and it is also understood that these naturally belong to the technical scope of the present disclosure.

In addition, the effects described in the specification are illustrative or exemplary only, and are not restrictive. That is, the technique according to the present disclosure can exhibit other effects apparent to those skilled in the art from the description of the specification, together with the above effects or instead of the above effects.

In addition, a program for causing hardware such as a CPU, a ROM, a RAM, and the like incorporated in a computer to exhibit functions equivalent to the configurations included in the autonomous mobile object 10 and the information processing server 20 can also be created, and a computer-readable non-transitory recording medium with the program recorded can also be provided.

In addition, each of the steps related to the process of the information processing system in the specification need not necessarily be processed in time series in the order described in the flowchart. For example, each of the steps related to the process of the information processing system may be processed in the order different from that described in the flowchart, or may be processed in parallel.

It should be noted that the following configurations also belong to the technical scope of the present disclosure.

(1)
An information processing apparatus including:
a communication unit that transmits sensing data collected by an autonomous mobile object to a server,
in which the communication unit transmits the sensing data related to a predetermined learning target to the server, and receives a dictionary for recognition generated by recognition learning using the sensing data collected by a plurality of the autonomous mobile objects and related to the learning target.

(2)
The information processing apparatus according to (1),
in which the communication unit receives control data related to behavior executed by the autonomous mobile object in the case where the learning target is recognized by a recognition process using the dictionary for recognition.

(3)
The information processing apparatus according to (2), further including:
a motion control unit that controls a motion of the autonomous mobile object,
in which in the case where the learning target is recognized by the autonomous mobile object, the motion control unit causes the autonomous mobile object to execute predetermined behavior on the basis of the control data.

(4)
The information processing apparatus according to (3),
in which the motion control unit causes the autonomous mobile object to collect the sensing data related to the learning target on the basis of a recognized command.

(5)
The information processing apparatus according to (4),
in which the motion control unit stores the collected sensing data in association with associated information and category information corresponding to the learning target.

(6)
The information processing apparatus according to any one of (1) to (5),
in which the learning target includes a predetermined object.

(7)
The information processing apparatus according to any one of (1) to (6),
in which the learning target includes a predetermined speech and action of a user.

(8)
The information processing apparatus according to any one of (1) to (7),
in which the learning target includes a predetermined scene.

(9)
The information processing apparatus according to any one of (1) to (8),
in which the learning target includes a predetermined terrain.

(10)
An information processing apparatus including:
a control unit that controls presentation of a progression status related to recognition learning for generating a dictionary for recognition used for an autonomous mobile object,
in which the recognition learning is executed by using sensing data collected by a plurality of the autonomous mobile objects and related to a predetermined learning target.

(11)
The information processing apparatus according to (10),
in which the progression status includes the number of the collected sensing data or the number of autonomous mobile objects that has collected the sensing data.

(12)

The information processing apparatus according to (10) or (11), in which the progression status includes recognition performance related to a recognizer in a middle of learning.

(13)

The information processing apparatus according to any one of (10) to (12), in which the progression status includes a recognition result in the case where the sensing data is input to the recognizer in the middle of learning.

(14)

The information processing apparatus according to (13), in which the recognition result includes at least any one of the sensing data in which the learning target is recognized, the sensing data in which the learning target is not recognized, or the sensing data in which an erroneous target is erroneously recognized as the learning target.

(15)

The information processing apparatus according to any one of (10) to (14), in which the progression status includes a recognition result in the case where input data designated by a user is input to the recognizer in the middle of learning.

(16)

The information processing apparatus according to any one of (10) to (15), in which the control unit controls presentation of a degree of contribution of the user to the recognition learning.

(17)

The information processing apparatus according to (16), in which the degree of contribution is determined on the basis of the number of the sensing data provided by the user.

(18)

The information processing apparatus according to any one of (10) to (17), further including a learning unit that performs the recognition learning related to the predetermined learning target using the sensing data collected by a plurality of the autonomous mobile objects.

(19)

An information processing method including:

transmitting sensing data collected by an autonomous mobile object and related to a predetermined learning target to a server; and receiving a dictionary for recognition generated by recognition learning using the sensing data collected by a plurality of the autonomous mobile objects and related to the learning target.

(20)

An information processing method including:

controlling, by a processor, presentation of a progression status related to recognition learning for generating a dictionary for recognition used for an autonomous mobile object, in which the recognition learning is executed by using sensing data collected by a plurality of the autonomous mobile objects and related to a predetermined learning target.

(21)

A program causing a computer to function as:

an information processing apparatus including a communication unit that transmits sensing data collected by an autonomous mobile object to a server, in which the communication unit transmits the sensing data related to a predetermined learning target to the server and receives a dictionary for recognition generated by recognition learning using the sensing data collected by a plurality of the autonomous mobile objects and related to the learning target.

(22)

A program causing a computer to function as:

an information processing apparatus including a control unit that controls presentation of a progression status related to recognition learning for generating a dictionary for recognition used for an autonomous mobile object, in which the recognition learning is executed by using sensing data collected by a plurality of the autonomous mobile objects and related to a predetermined learning target.

REFERENCE SIGNS LIST

10: Autonomous mobile object
110: Input unit
130: Recognition unit
140: Dictionary holding unit
150: Motion control unit
180: Communication unit
20: Information processing server
210: Learning unit
220: Latest dictionary holding unit
230: Application control unit
30: Information processing terminal

The invention claimed is:

1. An information processing apparatus, comprising:
a processor configured to:
    transmit first sensing data collected by a first autonomous mobile object of a plurality of autonomous mobile objects,
        wherein the first sensing data is related to a learning target;
    receive a dictionary generated by a recognition learning process, wherein
        the generation of the dictionary is based on the first sensing data collected by the first autonomous mobile object and second sensing data collected by a second autonomous mobile object of the plurality of autonomous mobile objects, and
        the second sensing data is related to the learning target; and
    recognize the learning target based on the received dictionary.

2. The information processing apparatus according to claim 1, wherein the processor is further configured to receive, based on the recognition of the learning target, control data related to a behavior executed by the first autonomous mobile object.

3. The information processing apparatus according to claim 2, wherein the processor is further configured to:
    control a motion of the first autonomous mobile object; and
    control, based on the control data and the recognition of the learning target, the first autonomous mobile object to execute the behavior.

4. The information processing apparatus according to claim 3, wherein the processor is further configured to:
  recognize a specific command; and
  control, based on the recognized specific command, the first autonomous mobile object to collect the first sensing data related to the learning target.

5. The information processing apparatus according to claim 4, wherein the processor is further configured to store the collected first sensing data in association with each of information corresponding to the learning target and category information corresponding to the learning target.

6. The information processing apparatus according to claim 1, wherein the learning target includes a specific object.

7. The information processing apparatus according to claim 1, wherein the learning target includes a speech of a user and an action of the user.

8. The information processing apparatus according to claim 1, wherein the learning target includes a specific scene.

9. The information processing apparatus according to claim 1, wherein the learning target includes a specific terrain.

10. An information processing apparatus, comprising:
  a processor configured to:
    receive sensing data collected by a plurality of autonomous mobile objects,
      wherein the sensing data is related to a learning target;
    execute a recognition learning process based the sensing data collected by the plurality of autonomous mobile objects;
    generate, based on the recognition learning process, a dictionary for recognition of the learning target; and
    control presentation of a progression status related to the recognition learning process.

11. The information processing apparatus according to claim 10, wherein the progression status includes at least one of a number of the collected sensing data or a number of autonomous mobile objects of the plurality of autonomous mobile objects that has collected the sensing data.

12. The information processing apparatus according to claim 10, wherein the progression status includes a recognition performance of a recognizer in a middle of the recognition learning process.

13. The information processing apparatus according to claim 10, wherein the progression status includes a recognition result of a recognizer in a case where the sensing data is input to the recognizer in a middle of the recognition learning process.

14. The information processing apparatus according to claim 13, wherein the recognition result includes at least one of the sensing data in which the learning target is recognized, the sensing data in which the learning target is not recognized, or the sensing data in which an erroneous target is erroneously recognized as the learning target.

15. The information processing apparatus according to claim 10, wherein the progression status includes a recognition result of a recognizer in a case where input data designated by a user is input to the recognizer in a middle of the recognition learning process.

16. The information processing apparatus according to claim 10, wherein the processor is further configured to control presentation of a degree of contribution of a user to the recognition learning process.

17. The information processing apparatus according to claim 16, wherein the processor is further configured to determine the degree of contribution based on a number of the sensing data provided by the user.

18. An information processing method, comprising:
  transmitting first sensing data collected by a first autonomous mobile object of a plurality of autonomous mobile objects,
    wherein the first sensing data is related to a learning target;
  receiving a dictionary generated by a recognition learning process, wherein
    the generation of the dictionary is based on the first sensing data collected by the first autonomous mobile object and second sensing data collected by a second autonomous mobile object of the plurality of autonomous mobile objects, and
    the second sensing data is related to the learning target; and
  recognizing the learning target based on the received dictionary.

19. An information processing method, comprising:
  receiving, by a processor, sensing data collected by a plurality of autonomous mobile objects,
    wherein the sensing data is related to a learning target;
  executing, by the processor, a recognition learning process based the sensing data collected by the plurality of autonomous mobile objects;
  generating, by the processor, based on the recognition learning process, a dictionary for recognition of the learning target; and
  controlling, by the processor, presentation of a progression status related to the recognition learning process.

* * * * *